United States Patent
Razdan et al.

(10) Patent No.: US 11,474,827 B1
(45) Date of Patent: Oct. 18, 2022

(54) REBOOT MIGRATION BETWEEN BARE-METAL SERVERS

(71) Applicant: Amazon Technologies, Inc., Seattle, WA (US)

(72) Inventors: Ashu Razdan, Kirkland, WA (US); Matthew Shawn Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 16/546,191

(22) Filed: Aug. 20, 2019

(51) Int. Cl.
*G06F 9/4401* (2018.01)
*G06F 9/455* (2018.01)
*G06F 3/06* (2006.01)

(52) U.S. Cl.
CPC ............ *G06F 9/4401* (2013.01); *G06F 3/067* (2013.01); *G06F 3/0611* (2013.01); *G06F 3/0647* (2013.01); *G06F 9/45541* (2013.01); *G06F 9/45558* (2013.01); *G06F 2009/4557* (2013.01); *G06F 2009/45575* (2013.01); *G06F 2009/45595* (2013.01)

(58) Field of Classification Search
CPC .... G06F 9/4401; G06F 3/0611; G06F 3/0647; G06F 3/067; G06F 9/45541; G06F 9/45558; G06F 2009/4557; G06F 2009/45575; G06F 2009/45595

USPC ......................................................... 709/226
See application file for complete search history.

(56) References Cited

U.S. PATENT DOCUMENTS

| | | | | |
|---|---|---|---|---|
| 9,348,646 | B1* | 5/2016 | Daya | G06F 9/4856 |
| 2013/0290542 | A1* | 10/2013 | Watt | H04L 67/1004 709/226 |
| 2014/0365626 | A1* | 12/2014 | Radhakrishnan | G06F 9/5033 709/222 |
| 2015/0236977 | A1* | 8/2015 | Terayama | H04L 43/065 709/224 |
| 2019/0286475 | A1* | 9/2019 | Mani | G06F 9/4856 |
| 2020/0065126 | A1* | 2/2020 | Zheng | G06F 9/5077 |
| 2020/0142732 | A1* | 5/2020 | Okuno | G06F 9/4856 |

\* cited by examiner

*Primary Examiner* — Kevin S Mai
(74) *Attorney, Agent, or Firm* — Lee & Hayes, P.C.

(57) ABSTRACT

This disclosure describes systems, devices, and methods for performing and facilitating tenant migration between multiple bare-metal servers. An example method includes receiving an indication of an impending reboot of a first bare-metal server. The first bare-metal server may be hosting a tenant. The method further includes identifying a second bare-metal server in a pre-initialized state. The method also includes causing the first bare-metal server to migrate data associated with the tenant to the second bare-metal server in advance of the reboot.

20 Claims, 11 Drawing Sheets

TENANT LOG
408

| Tenant Identifier | Last Migration Time | Last Host Server | Migration Status |
|---|---|---|---|
| Tenant 1 | Time 1 | Identifier 3 | Successful |
| Tenant 2 | Time 2 | Identifier 4 | Successful |
| Tenant 3 | Time 3 | Identifier 7 | Successful |
| Tenant 4 | Time 4 | Identifier 6 | Failed |

410 → Tenant Identifier
412 → Last Migration Time
414 → Last Host Server
416 → Migration Status

SERVER LOG
400

| Server Type | Server Identifier | Tenant Information |
|---|---|---|
| Type A | Identifier 1 | Tenant 1 |
| Type A | Identifier 2 | Tenant 2 |
| Type A | Identifier 3 | VACANT |
| Type A | Identifier 4 | VACANT |
| Type B | Identifier 5 | Tenant 3 |
| Type B | Identifier 6 | Tenant 4 |
| Type B | Identifier 7 | VACANT |
| Type B | Identifier 8 | VACANT |

FIG. 4A

TENANT LOG
408

| Tenant Identifier | Last Migration Time | Last Host Server | Migration Status |
|---|---|---|---|
| Tenant 1 | Time 1 | Identifier 3 | Successful |
| Tenant 2 | Time 2 | Identifier 4 | Successful |
| Tenant 3 | Time 3 | Identifier 7 | Successful |
| Tenant 4 | Time 4 | Identifier 6 | Failed |

REBOOT MIGRATION BETWEEN BARE-METAL SERVERS

BACKGROUND

Modern data centers can include multiple physical servers providing computer resources for various tenants. In various examples, a data center can include multiple shared physical servers, each hosting multiple tenants. A shared server may include a hypervisor to facilitate the sharing of resources in each server by the multiple tenants. A hypervisor can include software, firmware, and/or hardware that enables multiple distinct operating systems to run respective tenants, such as Virtual Machines (VMs), on the same hardware device. Further, some tenants can utilize computing resources distributed across multiple servers. Accordingly, if one of the servers is overloaded, loses power, or is rebooted, the tenants can remain functional by utilizing the resources of the other servers.

While hosting tenants on shared servers has various advantages, in some cases, it is advantageous to host some tenants on bare-metal servers. Unlike a shared server, a bare-metal server is designed to host a single tenant. A tenant hosted on a bare-metal server can be hosted exclusively on the bare-metal server. Bare-metal servers are often preferred for tenants that require a significant amount of processing power. In addition, because bare-metal servers do not require internal hypervisors, bare-metal servers are preferred for tenants that operate using externally hosted hypervisors. Despite many advantages of bare-metal servers over shared servers, bare-metal servers have a number of unique problems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

As illustrated in FIG. 1, tenant migration can be facilitated by an orchestrator that can communicate with and control various bare-metal servers in one or more data centers.

FIG. 4A illustrates an example of a server log that can be maintained by an orchestrator in order to efficiently identify vacant bare-metal servers available for migration. In some examples, the orchestrator can use the server log to select a particular vacant bare-metal server to which a tenant can be migrated.

FIG. 4B illustrates an example of a tenant log that can be maintained by an orchestrator in order to efficiently identify tenants that should or should not be migrated. For instance, the orchestrator can use the tenant log to prevent tenants that frequently cause reboots in different bare-metal servers from being migrated.

DETAILED DESCRIPTION

Figure 1:
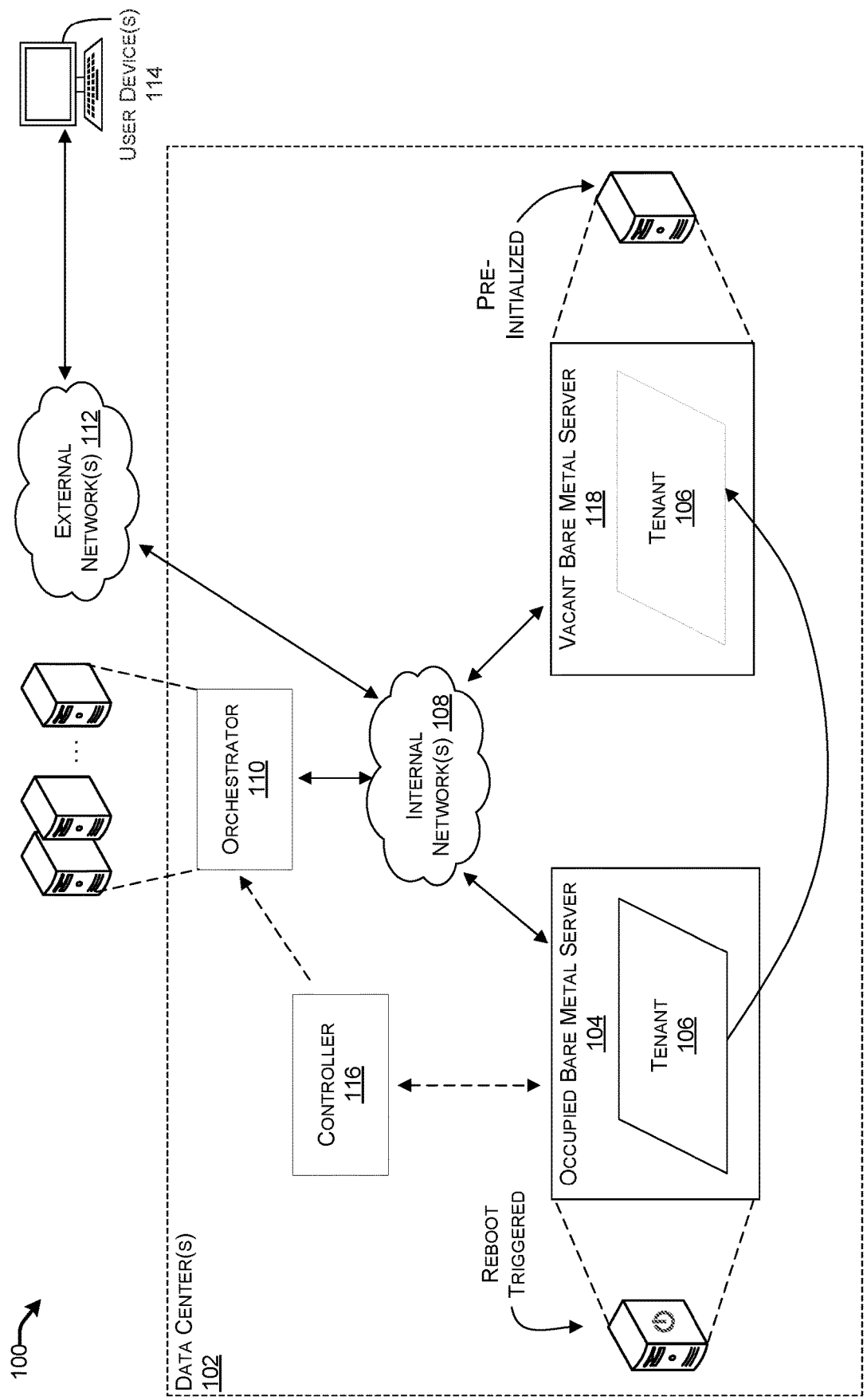
FIG. 1 illustrates an example environment for implementing tenant migration between bare-metal servers.

This disclosure describes systems, devices, and techniques for reducing reboot-related latency in tenants hosted by bare-metal servers. A tenant workload running on a bare-metal server has direct access to the underlying hardware resources, and thus for security reasons certain components of the bare-metal server need to be reset between tenants (and even between uses by the same tenant). For example, the BIOS (firmware used to perform hardware initialization during the booting process) may need to be reset and measured to ensure that the BIOS has not been tampered with, for example altered with malicious code that could then run in a privileged mode. During reboot, this introduces additional latency relative to a reboot on a virtualized server. In various implementations, before a reboot is performed in a bare-metal server hosting a tenant, the tenant is migrated to a vacant bare-metal server that is already pre-initialized. Accordingly, interruptions to the functioning of the tenant due to the reboot can be substantially reduced, and possibly eliminated.

A bare-metal server refers to a single-tenant physical server in a cloud provider network, as opposed to servers in a cloud provider network which may have multiple tenants (e.g., different customers) by virtualizing the server using a hypervisor to host multiple virtual machines for the multiple tenants. Bare-metal cloud servers may not run a hypervisor or be virtualized, but can still be delivered via a cloud provider network service model. In some scenarios, customers may use bare-metal servers to run their own hypervisor, or may run workloads in a non-virtualized environment for direct access to the processor and memory resources of the underlying server.

A cloud provider network, or "cloud," refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load.

Various implementations described herein utilize an orchestrator that facilitates the migration of tenants between bare-metal servers. The orchestrator can be a device, system, and/or Virtual Machine (VM) instance that can orchestrate the functions of multiple bare-metal servers within at least one data center. The orchestrator can direct bare-metal servers to migrate tenants, select vacant bare-metal servers to serve as destinations for tenants, and, in some cases, serve as a conduit through which the tenants can be migrated between bare-metal servers.

In particular implementations, only particular types of tenants are migrated between bare-metal servers. In some cases, tenants are migrated when they are associated with a relatively small amount of data. Accordingly, tenants that can be transferred in a shorter amount of time than an expected reboot are migrated. In some examples, tenants are migrated when they have been infrequently (or never) associated with previous reboots in a previous time interval. Thus, tenants prone to triggering reboots in host servers can be prevented from frequent migrations that could potentially occupy a disproportionate amount of resources in the data center(s).

In certain implementations, only particular types of bare-metal servers are selected as destinations. For instance, a bare-metal server to serve as a destination for a tenant may be selected among bare-metal servers that have at least comparable capabilities to the bare-metal server currently hosting the tenant. Accordingly, the performance of the tenant after migration can be comparable to its performance before migration.

Various devices, systems, and methods described herein improve the functioning of remotely hosted tenants. If a tenant remains hosted on a bare-metal server undergoing a reboot, the functionality of the tenant is suspended, or at least reduced, while the bare-metal server is undergoing the reboot. The reboot-related latency of the tenant can significantly interrupt the functions that are performed by the tenant. In some examples, a reboot can take minutes, which means that a tenant hosted by a rebooting bare-metal server is interrupted for at least the minutes the bare-metal server takes to reboot. However, the tenant can be transferred to another bare-metal server in a shorter amount of time than it takes for the original bare-metal server to reboot. For example, a tenant can be transferred between bare-metal servers in seconds, rather than minutes. Accordingly, implementations of the present disclosure can improve the functioning of tenants hosted by bare-metal servers by significantly reducing reboot-related latency of the tenants. Various implementations therefore provide improvements to the technological fields of computer networks, cloud-based computing, and data center management.

At least some implementations disclosed herein can be applied to real-world computer environments. For instance, various examples can be implemented in data centers, availability zones, geographic regions, bare-metal servers, and the like. In addition, various examples involve the physical transmissions of data across computer networks. Various implementations are therefore directed to practical, real-world applications.

Particular implementations of the present disclosure will now be described with reference to the accompanying figures.

FIG. 1 illustrates an example environment 100 for implementing tenant migration between bare-metal servers.

The environment 100 includes one or more data centers 102. In some cases, the data center(s) 102 include multiple data centers with different power backup, such that the multiple data centers are unlikely to lose power simultaneously. In particular, the data center(s) 102 illustrated in the environment 100 may be located in a single availability zone in a geographic region.

The data center(s) 102 include an occupied bare-metal server 104. As used herein, the terms "bare-metal server," "bare-metal instance," "bare-metal host," or their equivalents, can refer to a single physical server configured to run a single software tenant. A bare-metal server is different than a "shared server," which may be a single physical server configured to run multiple software tenants, simultaneously.

For instance, as illustrated in FIG. 1, the occupied bare-metal server 104 is hosting a tenant 106. As used herein, the term "tenant" can refer to software and/or data that can be hosted by a host device, such as a server. A tenant can occupy one or more resources on the host device. In various examples, a single tenant may be associated with a single user or entity (e.g., a corporation, a business, a government agency, a non-profit, etc.), a single user or entity account, or group of users or entities. For the purposes of this discussion, the terms "user" and "entity" can be used interchangeably throughout this disclosure. A tenant can be hosted in a bare-metal server or a shared server. In various implementations, the tenant 106 can be the only tenant hosted on the occupied bare-metal server 104. Further, the tenant 106 may be exclusively hosted on the occupied bare-metal server 104.

The occupied bare-metal server 104 may be connected to one or more internal networks 108 within the data center(s) 102. The internal network(s) 108 can include any number of nodes and/or interfaces configured to transmit data between various devices in the data center(s) 102. The internal network(s) 108 may include at least one Local Area Network (LAN). For instance, each data center within the data center(s) 102 may include a respective LAN that interconnects devices within the data center. In particular implementations, the internal network(s) 108 include at least one optical-fiber network that is capable of high-speed data transfer between devices within the data center(s) 102.

The occupied bare-metal server 104 may be configured to communicate with an orchestrator 110 over the internal network(s) 108. The orchestrator 110 can include a single device, multiple devices, or at least one Virtual Machine (VM) instance hosted on at least one device that can transmit and receive data over the internal network(s) 108. The orchestrator 110 can communicate with various bare-metal servers, including the occupied bare-metal server 104, within the data center(s) 102. The orchestrator 110 may be configured to log and/or identify bare-metal servers in the data center(s) 102 that are occupied, tenants occupying the bare-metal servers in the data center(s) 102, as well as bare-metal servers in the data center(s) 102 that are unoccupied or vacant. The orchestrator 110 may also be configured to determine a number and/or frequency of reboots triggered by individual tenants hosted in the bare-metal servers. In various implementations, the orchestrator 110 may be able to instruct the bare-metal servers to perform different actions, such as tenant migration.

The internal network(s) 108 may be further connected to one or more external networks 112 outside of, or remote from, the data center(s) 102. According to various examples, the external network(s) 112 may include at least one Wide Area Network (WAN). For instance, the external network(s) 112 may include the Internet. In some cases, the external network(s) 112 can include one or more wired networks and/or one or more wireless networks. In particular implementations, at least one firewall separates the internal network(s) 108 from the external network(s) 112. Accordingly, the data center(s) 102 can be protected from malicious data traffic or unauthorized access originating from outside of the data center(s) 102.

One or more user devices 114 may be configured to communicate with systems, devices, and functionality within the data center(s) 102 via the external network(s) 112. The user device(s) 114 can include any form of User Equipment (UE). As used herein, the terms "UE," "user device," "wireless communication device," "wireless device," "communication device," "mobile device," and "client device," can be used interchangeably to describe any device (e.g., the user device 102) that is capable of transmitting/receiving data over a communication interface. In some cases, the communication interface is a wired interface. In certain examples, the communication interface can correspond to a wireless interface, such that the device can transmit and/or receive data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology. The external network(s) 112, for instance, may be used to transmit data to and from the data center(s) 102 via any of the communication technologies, protocols, or standards described herein.

In various implementations, the user device(s) 114 may be associated with a single user account in a cloud hosting service. In some cases, the cloud hosting service can host one or more user interfaces (e.g., a specialized application or a generic Internet browser) that are provided on the user device(s) 114. Using the user interfaces, a user of the user account can control the tenant 106 and/or trigger a reboot of the occupied bare-metal server 104. The user account may control the tenant 106 hosted in the occupied bare-metal server 104 and may therefore utilize the remote computing resources provided by the occupied bare-metal server 104. According to particular implementations, the user account may correspond to a subscription for a particular amount of guaranteed computing resources. Thus, the occupied bare-metal server 104 may have a particular amount of processing capabilities, memory capacity, or the like, associated with the subscription. In some cases, a user can log onto the user account via the user interface(s) on the user device(s) 114. After logging into the user account, the user may control the functioning of the tenant 106 and/or the occupied bare-metal server 104 remotely via the user interface(s).

For various reasons, a reboot may be triggered in the occupied bare-metal server 104. In some instances, software running on the occupied bare-metal server 104 may have crashed or may have been rendered in operable due to a variety of reasons, or unauthorized access to the occupied BM server 104 may have occurred. In certain cases, a system administrator may trigger the reboot for security reasons. In some examples, a user logged onto a particular account associated with the tenant 106 may trigger the reboot remotely via input to the user device(s) 114.

A controller 116 may be configured to trigger and/or identify the reboot in the occupied bare-metal server 104. In some cases, the controller 116 may include at least one control plane device configured to implement routing of data plane packets through the occupied bare-metal server 104, the orchestrator 110, and/or through other devices within the data center(s) 102. The controller 116 can trigger the reboot of the occupied bare-metal server 104 in a variety of ways. For instance, the controller 116 may identify that the occupied bare-metal server 104 has crashed, that a system administrator has triggered the reboot, or that the particular account associated with the tenant 106 has triggered the reboot remotely via the user device(s) 114. In various implementations, the controller 116 may trigger the reboot of the occupied bare-metal server 104 by signaling the occupied bare-metal server 104 through control plane interfaces in the internal network(s) 108. In some cases, the controller 116 may receive, from the occupied bare-metal server 104, an indication that the occupied bare-metal server 104 is about to trigger a reboot. The controller 116 may further indicate, to the orchestrator 110, that a reboot of the occupied bare-metal server 104 is impending. The controller 116 may communicate with the orchestrator 110 via control plane interfaces in the internal network(s) 108.

During a reboot, a bare-metal server (such as the occupied bare-metal server 104) may be initially scrubbed. For instance, data (e.g., data associated with the tenant 106) can be deleted from the bare-metal server. In some cases, the bare-metal server may further undergo a measurement process. During the measurement process, various components of the bare-metal server, such as components in firmware and/or the Basic-Input and Output System (BIOS), are measured by the bare-metal server to ensure that a previous host has not altered the components with malicious code. If the previous host has altered the components with potentially malicious code, the reboot process may include an additional scrubbing process to reset the components back to their original settings. Depending on the extent of the measurement and/or scrubbing in the reboot, the reboot can take a significant amount of time (e.g., minutes).

In implementations of the present disclosure, the occupied bare-metal server 104 may temporarily hold the reboot. Before carrying out the reboot, the occupied bare-metal server 104 may notify the orchestrator 110 that the reboot is impending. In particular implementations, the occupied bare-metal server 104 may transmit, via the internal network(s) 108, a message to the orchestrator 110 indicating that the occupied bare-metal server 104 has an impending reboot. The message can identify the occupied bare-metal server 104 and/or the tenant 106 hosted by the occupied bare-metal server 104. In some cases, the occupied bare-metal server 104 can further inform the orchestrator 110 of other characteristics of the occupied bare-metal server 104 and/or the tenant 106.

In various implementations, the orchestrator 110 may check whether the tenant 106 is appropriate for migration. In particular implementations, the orchestrator 110 may confirm that the tenant 106 can be migrated with a minimal transfer of data. In some cases, the orchestrator 110 may determine that the tenant 106 is appropriate for migration if the tenant 106 is not associated with any data stored in local memory of the occupied bare-metal server 104. When the tenant 106 is not associated with data stored in local memory, the tenant 106 can be migrated by transferring only state information corresponding to the tenant 106, such as Complementary Metal Oxide Semiconductor (CMOS) block settings, clock settings, BIOS settings, or the like. In some instances, the state information can include one or more software and/or hardware settings set by a user account associated with the tenant 106.

In some implementations, the orchestrator 110 may determine that the tenant 106 is appropriate for migration if the tenant 106 is only associated with a minimal amount of data stored in the local memory of the occupied bare-metal server 106. For instance, the orchestrator 110 may determine whether the amount of data associated with the tenant is less than a particular threshold. In some cases, the particular threshold can be predetermined. For instance, the particular threshold could be equal to 1 gigabyte (GB), 10 GB, 100 GB, or the like.

According to certain implementations, the orchestrator 110 can dynamically calculate the threshold amount of data associated with the tenant 106. The orchestrator 110 may predict the amount of time that the occupied bare-metal server 104 will take to reboot, which may be referred to as a "predicted reboot latency." The predicted reboot latency can be based on an amount of data associated with the tenant 106, the amount of local memory of the occupied bare-metal server 104, an amount of firmware associated with the occupied bare-metal server 104, a vendor of the bare-metal server 104, or the like. For instance, the predicted reboot latency may be proportional to an amount of components (e.g., data) to be measured by the occupied bare-metal server 104 in the reboot. In some cases, the predicted reboot latency is based on at least one latency associated with at least one previous reboot by the occupied bare-metal server 104. For instance, if a previous reboot latency of the occupied bare-metal server 104 was 100 seconds, the predicted reboot latency may also be 100 seconds.

The orchestrator 110 may also determine a predicted data transfer rate through the orchestrator 110 and/or the internal network(s) 108. In some cases, the predicated data transfer rate can be based on at least one type of network in the internal network(s) 108, a congestion level of the internal network(s) 108, a load on the orchestrator 110, or the like. In some implementations, data transfer rates across an interface in the internal network(s) 108 can be estimated by a device (e.g., the orchestrator 110) transmitting a request message over the interface, receiving a response message in response to the request over the interface, calculating a round-trip-time according to the transmission time of the request message and a reception time of the response message, and dividing the round-trip-time in half to estimate the one-way transmission time across the interface. In some examples, the data transfer rate across the orchestrator 110 and/or internal network(s) 108 can be predicted based on previous transmission latencies through the orchestrator 110 and/or the internal network(s) 108.

The orchestrator 110 can determine the threshold based on the predicted reboot latency and the predicted data transfer rate. For instance, the orchestrator 110 can calculate the threshold based on the following Formula 1:

$$T_{data} = t_{reboot} * R_{transfer} \qquad \text{Formula 1:}$$

wherein $T_{data}$ is the threshold, $t_{reboot}$ is the predicted reboot latency of the occupied bare-metal server 104, and $R_{transfer}$ is the predicted data transfer rate through the internal network(s) 108 and/or the orchestrator 110. The orchestrator 110 may determine whether the data associated with the tenant 106 is equal to or less than the threshold. If the data associated with the tenant 106 is equal to or less than the threshold, then the orchestrator 110 may determine that the tenant 106 is appropriate for migration. In various examples, the tenant 106 may be inappropriate for migration if the orchestrator 110 anticipates that the reboot latency of the occupied bare-metal server 104 is shorter than the time it would take to migrate the tenant 106 to another bare-metal server.

If the orchestrator 110 determines that the tenant 106 is appropriate for migration, the orchestrator 110 may facilitate migration of the tenant 106. However, if the orchestrator 110 determines that the tenant 106 is not appropriate for migration, the orchestrator 110 may refrain from causing the tenant 106 to migrate from the occupied bare-metal server 104. In some cases, the orchestrator 110 may instruct the occupied bare-metal server 104 to perform the reboot via signaling over the internal network(s) 108.

In implementations in which the orchestrator 110 facilitates migration of the tenant 106, the orchestrator 110 may identify a vacant bare-metal server 118 that is in a pre-initialized state. As used herein, the term "pre-initialized," and its equivalents, can refer to a state of a server that is vacant, ready to accept a new tenant, and is ready to launch the tenant in response to receiving the data associated with the tenant. For example, a pre-initialized device may be held in a pre-enumerationed state. As used herein, the term "pre-enumerationed" may refer to a device that has at least partly undergone a reboot process. A pre-enumerationed device may have performed scrubbing and/or measurement, but may be held in a state in which the device has not yet performed enumeration. In some cases, the BIOS of the pre-enumerationed device has performed hardware initializations of the device, such that an operating system of the device is ready to launch, but the BIOS has not yet enumerated a boot volume and/or appropriate drive to the device. To conclude the reboot and boot the BIOS, the BIOS may pre-identify a location of the boot volume (e.g., a storage volume). Once a pre-enumerationed device has received data associated with a tenant, the device can perform enumeration and launch the operating system. In the example illustrated in FIG. 1, the orchestrator 110 may select the vacant bare-metal server 118. In some implementations, the orchestrator 110 may confirm that the vacant bare-metal server 118 is unoccupied and able to host the tenant 106 by transmitting a vacancy inquiry to the vacant bare-metal server 118 and receiving a vacancy confirmation from the vacant bare-metal server 118. In instances in which the vacant bare-metal server 118 is occupied, the orchestrator 110 may identify another bare-metal server capable of hosting the tenant 106.

Upon identifying the vacant bare-metal server 118, the orchestrator 110 may cause the occupied bare-metal server 104 to migrate the tenant 106 to the vacant bare-metal server 118. In some instances, the orchestrator may inform the occupied bare-metal server 104 of the vacant bare-metal server 118. In response, the occupied bare-metal server 104 may establish a peer-to-peer connection with the vacant bare-metal server 118. For instance, the occupied bare-metal server 104 and the vacant bare-metal server 118 may exchange handshake messages that enable the occupied bare-metal server 104 and the vacant bare-metal server 118 to establish the peer-to-peer connection and exchange data. The occupied bare-metal server 104 may transmit data associated with the tenant 106 to the vacant bare-metal server 118 over the peer-to-peer connection. Accordingly, the tenant 106 may be migrated from the occupied bare-metal server 104 to the vacant bare-metal server 118.

In some example implementations, the orchestrator 110 transfers the data associated with the tenant 106 from the occupied bare-metal server 104 to the vacant bare-metal server 118. For example, the orchestrator 110 may prompt the occupied bare-metal server 104 to transmit the data associated with the tenant 106 to the orchestrator 110. For instance, the orchestrator 110 may transmit a request for the tenant data to the occupied bare-metal server 104. Once the orchestrator 110 receives the data associated with the tenant 106, the orchestrator 110 can automatically transmit the data associated with the tenant to the vacant bare-metal server 118. In some implementations, the orchestrator-mediated transfer of the data associated with the tenant 106 can be performed more quickly than peer-to-peer transfer, because the orchestrator-mediated transfer can be performed using pre-established interfaces within the data center(s) 102 and does not require the establishment of a new peer-to-peer interface within the data center(s) 102.

After the occupied bare-metal server 104 has transferred the data associated with the tenant 106, the bare-metal server 104 may carry out the triggered reboot. The reboot may be a multi-step process. For instance, the reboot may begin with a measurement step. During the measurement step, firmware (e.g., a BIOS) of the bare-metal server 104 may be inspected for changes that have occurred during the occupation of the tenant 106 in the bare-metal server 104. If any changes are identified, the firmware can be flashed back to factory settings. In various implementations, firmware can be scrubbed so that future tenants of the bare-metal server 104 are not impacted by the occupation of the tenant 106 in the bare-metal server 104. In some cases, the bare-metal server 104 is held in a pre-enumerationed state until a new tenant is migrated onto the bare-metal server 104.

Once the vacant bare-metal server 118 receives the data associated with the tenant 106, the bare-metal server 118 may host the tenant 106. The orchestrator 110 may ensure that routing information in the data center(s) 102 is updated so that signaling directed to the tenant 106 is provided to the bare-metal server 118, rather than the bare-metal server 104. For instance, the orchestrator 110 may update a routing table associated with the internal network(s) 108 so that data packets addressed to the IP address associated with the tenant 106 are routed to the bare-metal server 118. In various implementations, the IP address of the tenant 106 remains the same before and after migration. Once the tenant 106 is hosted in the bare-metal server 118, the tenant 106 can resume functionality.

In various implementations, the reboot conducted by the bare-metal server 104 can take over a minute. For instance, the reboot can be about 100 to 500 seconds. In contrast, the migration of the tenant 106 from the bare-metal server 104 to the bare-metal server 118 can take less than a minute. Accordingly, by migrating the tenant 106, rather than rebooting the bare-metal server 104 while the tenant 106 is hosted on the bare-metal server 104, an overall reboot-associated latency can be reduced.

In some examples, after the data is transferred from the bare-metal server 104 to the bare-metal server 118, the tenant 106 can be later migrated back from the bare-metal server 118 to the bare-metal server 104 that previously hosted the tenant 106. For instance, the data previously transferred to the bare-metal server 118 can be transferred back to the bare-metal server 104. In some instances, the orchestrator 110 may cause the tenant 106 to migrate back to the bare-metal server 104 upon receiving an indication of an impending reboot from the bare-metal server 118. If the bare-metal server 104 is held in a pre-enumerationed state, the tenant 106 can resume operations after data associated with the tenant is transferred to the bare-metal server 104 without the bare-metal server 104 rebooting an additional time.

Figure 2A:
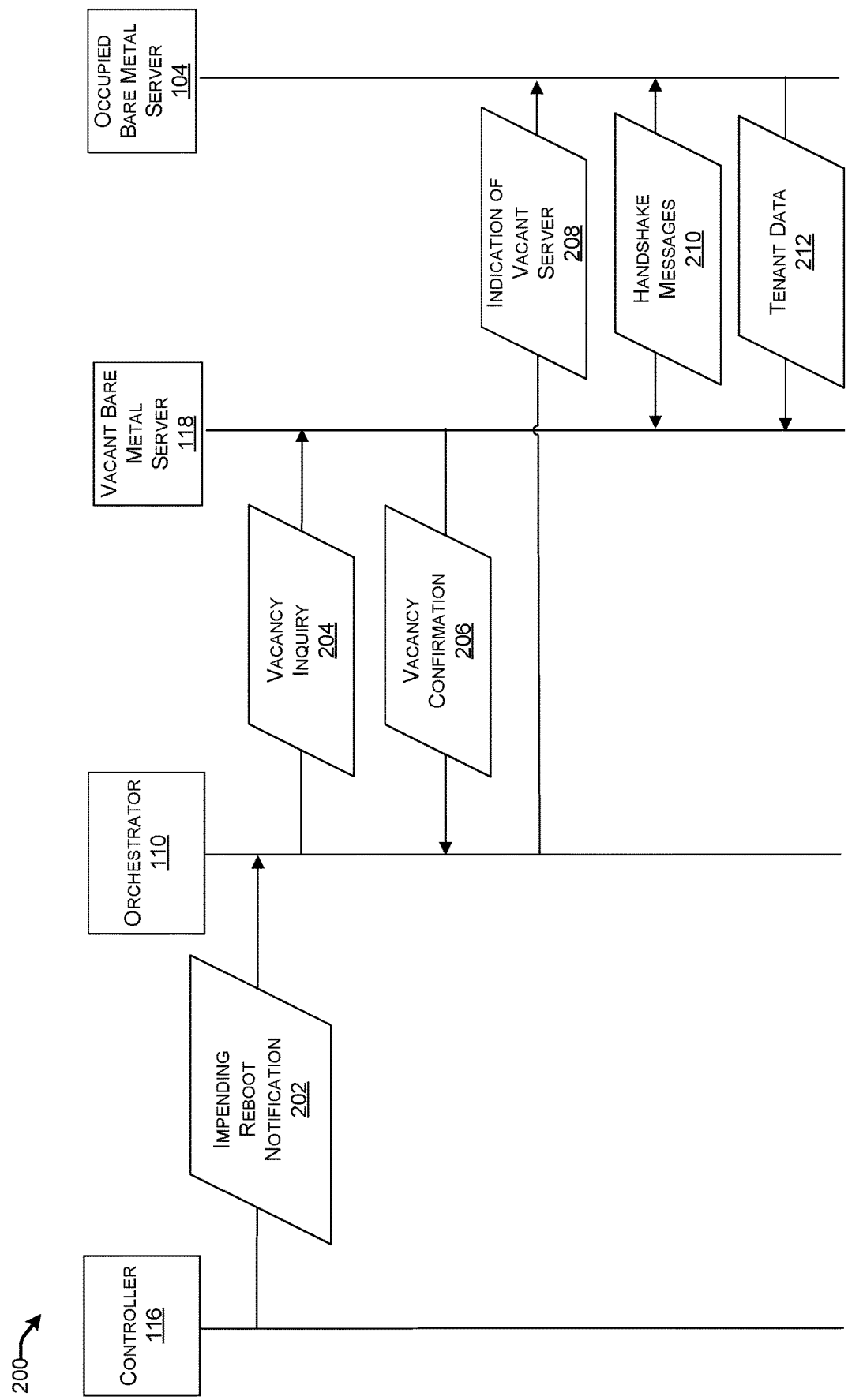
FIG. 2A illustrates example signaling of peer-to-peer transfer of a tenant from a first bare-metal server (e.g., an "occupied" bare-metal server) to a second bare-metal server (e.g., a "vacant" bare-metal server). In the example illustrated in FIG. 2A, data associated with the tenant can be transferred between the first bare-metal server and the second bare-metal server through a peer-to-peer connection between the first bare-metal server and the second bare-metal server.

FIG. 2A illustrates example signaling 200 of peer-to-peer transfer of a tenant. As illustrated, the signaling 200 occurs between the occupied bare-metal server 104, the orchestrator 110, the controller 116, and the vacant bare-metal server 118 described above with reference to FIG. 1. The occupied bare-metal server 104 may be hosting a tenant.

In various implementations, the signaling 200 can occur in response to the occupied bare-metal server 104 recognizing that a reboot of the occupied bare-metal server 104 is impending. For instance, the controller 116 may recognize that software of the bare-metal server 104 has crashed or that an unauthorized user has accessed the bare-metal server 104, the tenant hosted by the bare-metal server 104, and/or the data associated with that tenant. In some cases, the controller 116 may identify a command from a user interface associated with the tenant requesting a reboot of the occupied bare-metal server 104. In some cases, a security policy may be triggered that causes execution of a reboot. The occupied bare-metal server 104 may refrain from carrying out the reboot during the signaling 200.

The controller 116 may transmit an impending reboot notification 202 to the orchestrator 110. In some cases, the occupied bare-metal server 104 may transmit the reboot notification 216 directly to the orchestrator 110 over one or more internal networks. The impending reboot notification 202 may indicate, to the orchestrator 110 that the occupied bare-metal server 104 is going to undergo a reboot. In some cases, the impending reboot notification 202 may also inform the orchestrator 110 of the tenant that is hosted by the occupied bare-metal server 104. For instance, the impending reboot notification 202 may identify the tenant and, in some cases, indicate processing and/or memory resources utilized by the tenant.

In particular implementations, the orchestrator 110 may confirm that the tenant is appropriate for migration. For instance, the orchestrator 110 may confirm that the tenant is not associated with data stored in local storage in the occupied bare-metal server 104. According to some implementations, the orchestrator 110 may selectively facilitate migrations of tenants that are not utilizing local storage of a host server, such that the tenants can be migrated by transferring state information only. In some cases, the orchestrator 110 may confirm that the tenant is associated with only a minimal amount of data in local storage. For instance, the orchestrator 110 may determine that rebooting the occupied bare-metal server 104 will take longer than the time it will take to transfer the data associated with the tenant to another bare-metal server.

In some cases, the orchestrator 110 confirms that the vacant bare-metal server 118 can accept the tenant. The orchestrator 110 may transmit a vacancy inquiry 204 to the vacant bare-metal server 118. In some cases, the orchestrator 110 may have an existing log of vacant bare-metal servers including the vacant bare-metal server 118, such that the orchestrator 110 may predict that the vacant bare-metal server 118 is ready to accept a tenant. The vacancy inquiry 204 may be a request for confirmation that the vacant bare-metal server 118 is unoccupied and ready to accept the tenant.

In response, the vacant bare-metal server 118 may transmit a vacancy confirmation 206 to the orchestrator 110. The vacancy confirmation 206 may inform the orchestrator 110 that the vacant bare-metal server 118 is unoccupied and/or anticipating the transfer of the tenant.

In particular implementations, the vacancy inquiry 204 and the vacancy confirmation 206 can be omitted from the signaling 200. For instance, the orchestrator may rely entirely on a pre-existing log stored at the orchestrator 110. The log may indicate that the vacant bare-metal server 118 is, in fact, vacant, at least similar to the occupied bare-metal server 104, and/or ready to host the tenant.

The orchestrator 110 may transmit an indication of the vacant server 208 to the occupied bare-metal server 104. In some instances, the indication of the vacant server 208 may include an instruction to migrate the tenant to the vacant bare-metal server 118. In various cases, the indication of the vacant server 108 can inform the occupied bare-metal server 104 of the vacant bare-metal server 118. For instance, the indication of the vacant server 208 may include routing information, address information, port information, or the like, that may enable the occupied bare-metal server 104 to exchange messages with the vacant bare-metal server 118

The occupied bare-metal server 104 may exchange handshake messages 210 with the vacant bare-metal server 118. For instance, the handshake messages 210 may include a request message transmitted from the occupied bare-metal server 104, which may request the establishment of a peer-to-peer connection. The handshake messages 210 may further include a response message transmitted from the vacant bare-metal server 118 to the occupied bare-metal server 104 and may confirm acceptance of the peer-to-peer connection. In some cases, the handshake messages 210 can include an exchange of security keys, routing information, or the like. As a result of the exchange of handshake messages 210 between the occupied bare-metal server 104 and the vacant bare-metal server 118, the peer-to-peer connection may be established between the occupied bare-metal server 104 and the vacant bare-metal server 118.

The occupied bare-metal server 104 may transmit tenant data 212 to the vacant bare-metal server 118 over the peer-to-peer connection. In various implementations, the peer-to-peer connection may bypass the orchestrator 110, such that the tenant data 212 can be transmitted from the occupied bare-metal server 104 directly to the vacant bare-metal server 118 without the tenant data 212 first being transferred to, and by, the orchestrator 110.

After the signaling 200 has concluded, the tenant may be hosted on the bare-metal server 118. Accordingly, the bare-metal server 104 can undergo the reboot without interfering with the functionality of the tenant.

Figure 2B:
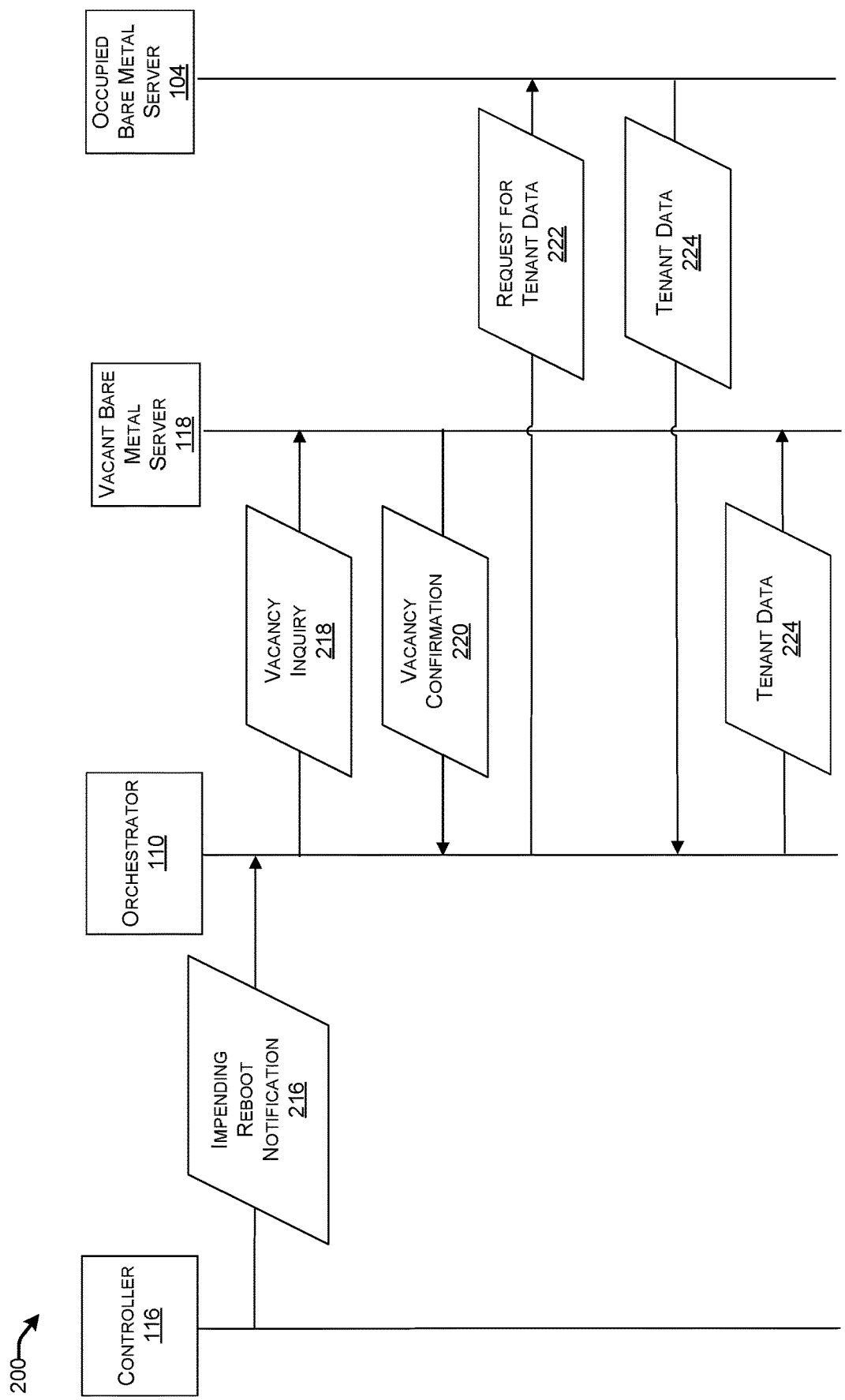
FIG. 2B illustrates example signaling of orchestrator-mediated transfer of a tenant from a first bare-metal server (e.g., an "occupied" bare-metal server) to a second bare-metal server (e.g., a "vacant" bare-metal server). In the example illustrated in FIG. 2B, data associated with the tenant can be transferred between the first bare-metal server and the second bare-metal server through an orchestrator connected to the first bare-metal server and the second bare-metal server.

FIG. 2B illustrates example signaling 214 of orchestrator-mediated transfer of a tenant. As illustrated, the signaling 200 occurs between the occupied bare-metal server 104, the orchestrator 110, and the vacant bare-metal server 118 described above with reference to FIG. 1. The occupied bare-metal server 104 may be hosting a tenant.

In various implementations, the signaling 214 can occur in response to the occupied bare-metal server 104 recognizing that a reboot of the occupied bare-metal server 104 is impending. For instance, the controller 116 may recognize that software of the bare-metal server 104 has crashed or that an unauthorized user has accessed the bare-metal server 104, the tenant hosted by the bare-metal server 104, and/or the data associated with that tenant. In some cases, the controller 116 may identify a command from a user interface associated with the tenant requesting a reboot of the occupied bare-metal server 104. In some cases, a security policy may be triggered that causes execution of a reboot. The occupied bare-metal server 104 may refrain from carrying out the reboot during the signaling 200.

The controller 116 may transmit an impending reboot notification 216 to the orchestrator 110. In some cases, the occupied bare-metal server 104 may transmit the reboot notification 216 directly to the orchestrator 110 over one or more internal networks. The impending reboot notification 216 may indicate, to the orchestrator 110 that the occupied bare-metal server 104 is going to undergo a reboot. In some cases, the impending reboot notification 216 may also inform the orchestrator 110 of the tenant that is hosted by the occupied bare-metal server 104. For instance, the impending reboot notification 216 may identify the tenant and, in some cases, indicate processing and/or memory resources utilized by the tenant.

In particular implementations, the orchestrator 110 may confirm that the tenant is appropriate for migration. For instance, the orchestrator 110 may confirm that the tenant is not associated with data stored in local storage in the occupied bare-metal server 104. According to some implementations, the orchestrator 110 may selectively facilitate migrations of tenants that are not utilizing local storage of a host server, such that the tenants can be migrated by transferring state information only. In some cases, the orchestrator 110 may confirm that the tenant is associated with only a minimal amount of data in local storage. For instance, the orchestrator 110 may determine that rebooting the occupied bare-metal server 104 will take longer than the time it will take to transfer the data associated with the tenant to another bare-metal server. Moreover, the orchestrator may determine that rebooting the bare-metal server 104 will take a first amount of time that is a threshold amount greater than a second amount of time it would take to transfer the data associated with the tenant to the other bare-metal server.

In some cases, the orchestrator 110 confirms that the vacant bare-metal server 118 can accept the tenant. The orchestrator 110 may transmit a vacancy inquiry 218 to the vacant bare-metal server 118. In some cases, the orchestrator 110 may have an existing log of vacant bare-metal servers including the vacant bare-metal server 118, such that the orchestrator 110 may predict that the vacant bare-metal server 118 is ready to accept a tenant. The vacancy inquiry 216 may be a request for confirmation that the vacant bare-metal server 118 is unoccupied and ready to accept the tenant.

In response, the vacant bare-metal server 118 may transmit a vacancy confirmation 220 to the orchestrator 110. The vacancy confirmation 220 may inform the orchestrator 110 that the vacant bare-metal server 118 is unoccupied and/or anticipating the transfer of the tenant.

In particular implementations, the vacancy inquiry 218 and the vacancy confirmation 220 can be omitted from the signaling 200. For instance, the orchestrator may rely entirely on a pre-existing log stored at the orchestrator 110. The log may indicate that the vacant bare-metal server 118 is, in fact, vacant, at least similar to the occupied bare-metal server 104, and/or ready to host the tenant.

The orchestrator 110 may transmit a request for tenant data 222 to the occupied bare-metal server 104. In response, the occupied bare-metal server 104 may transmit the tenant data 224 to the orchestrator over an existing communication interface between the occupied bare-metal server 104 and the orchestrator. For instance, the occupied bare-metal server 104 may transmit the tenant data 224 over the same interface that the occupied bare-metal server 104 used to transmit the impending reboot notification 216. The orchestrator 110, in turn, may transmit the tenant data 224 to the vacant bare-metal server 118. As a result, the vacant bare-metal server 118 may receive the tenant data 224 from the occupied bare-metal server 104 via the orchestrator 110.

After the signaling 200 has concluded, the tenant may be hosted on the bare-metal server 118. Accordingly, the bare-metal server 104 can undergo the reboot without interfering with the functionality of the tenant.

Figure 3:
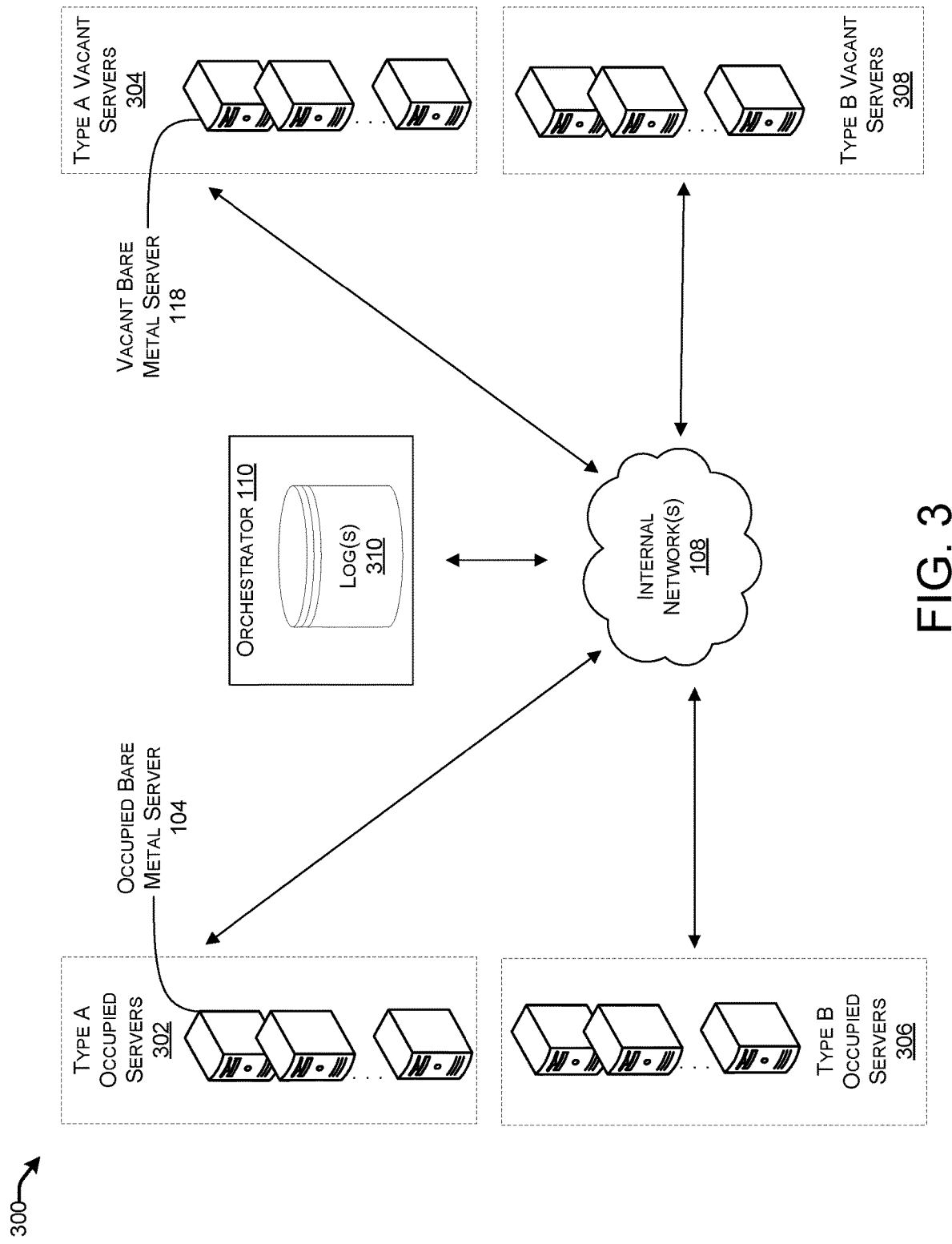
FIG. 3 illustrates an example environment of at least one data center with a variety of different types of bare-metal servers arranged into two different types (e.g., "Type A" and "Type B"). In various implementations described with reference to FIG. 3, tenant migration may occur between bare-metal servers of the same type.

FIG. 3 illustrates an example environment 300 of at least one data center with a variety of different types of bare-metal servers. Various elements discussed above with reference to FIGS. 1, 2A, and 2B, such as the occupied bare-metal server 104, the orchestrator 108, and the vacant bare-metal server 118, will also be described with reference to the example environment 300 of FIG. 3.

The environment 300 may include multiple Type A occupied servers 302 and Type A vacant servers 304. The Type A occupied servers 302 may include bare-metal servers that are hosting tenants. The Type A vacant servers 304 may include pre-initialized bare-metal servers that are not hosting tenants but that are capable of hosting tenants.

As used herein, a "type" of server may refer to a processing capability of the server, a memory capacity of the server, a vendor of the server, or the like. The Type A occupied servers 302 and Type A vacant servers 304 may include multiple servers with at least similar processing capabilities. For instance, each one of the Type A occupied servers 302 and Type A vacant servers 304 may include a processor with a processor speed that is within a predetermined range, or a processor speed that is equal to or greater than a certain processing speed. The Type A occupied servers 302 and the Type A vacant servers 304 may include multiple servers with at least similar memory capacities. For instance, each one of the Type A occupied servers 302 and Type A vacant servers 304 may include a memory device capable of storing an amount of bytes within a predetermined range, or an amount of storage/bytes that is greater than or equal to a particular amount of storage/bytes. In some cases, each one of the Type A occupied servers 302 and Type A vacant servers 304 may be produced and/or distributed by the same manufacturer or distributor (or by different manufacturers/distributors). In various implementations, the Type A occupied servers 302 and the Type A vacant servers 304 may have the same or similar capabilities.

The environment 300 may further include multiple Type B occupied servers 306 and Type B vacant servers 308. The Type B occupied servers 306 may include bare-metal servers that are hosting tenants. The Type B vacant servers 308 may include pre-initialized bare-metal servers that are not hosting tenants but that are capable of hosting tenants.

In various implementations, the Type B occupied servers 306 and the Type B vacant servers 308 may have the same or similar capabilities. In some cases, the Type B occupied servers 306 and Type B vacant servers 308 may include multiple servers with at least similar processing capabilities. For instance, each one of the Type B occupied servers 306 and Type B vacant servers 308 may include a processor with a processor speed that is within a predetermined range, or a processor speed that is equal to or greater than a certain processing speed. The Type B occupied servers 306 and the Type B vacant servers 308 may include multiple servers with at least similar memory capacities. For instance, each one of the Type B occupied servers 306 and Type B vacant servers 308 may include a memory device capable of storing an amount of bytes within a predetermined range, or an amount of storage/bytes that is greater than or equal to a particular amount of storage/bytes. In some cases, each one of the Type B occupied servers 306 and Type B vacant servers 308 may be produced by the same manufacturer or distributor (or by different manufacturers/distributors).

The Type A servers 302 and 304 may have different capabilities than the Type B servers 306 and 308. For instance, the Type A servers 302 and 304 may include faster (or different number of) processors and/or larger memory devices than the Type B servers 306 and 308. In some cases, the Type A servers 302 and 304 may be manufactured by a different vendor than the Type B servers 306 and 308. Accordingly, a tenant hosted by the Type A occupied servers 302 may have a different performance than an equivalent tenant hosted by the Type B occupied servers 306.

The orchestrator 110 may communicate with the Type A occupied servers 302, the Type A vacant servers 304, the Type B occupied servers 306, and/or the Type B vacant servers over the internal network(s) 108. When the orchestrator 110 receives an indication of an impending reboot from one of the Type A occupied servers 302 that is hosting a tenant, the orchestrator 110 may select a destination for the tenant from the Type A vacant servers 304. For instance, in the example illustrated in FIG. 3, the occupied bare-metal server 104 is among the Type A occupied servers 302 and the vacant bare-metal server 118 is selected among the Type A vacant servers 304. Similarly, when the orchestrator 110 receives an indication of an impending reboot from one of the Type B occupied servers 306 that is hosting a tenant, the orchestrator 110 may select a destination for the tenant from the Type B vacant servers 308. Thus, the orchestrator 110 may facilitate tenant migration between servers that have similar capabilities. Accordingly, tenants can maintain their performances before and after migration.

In various implementations, a particular number or percentage of vacant bare-metal servers in each type may be reserved. For instance, a first predetermined percentage of the Type A servers can be reserved as the Type A vacant servers 304, and a second predetermined percentage of the Type B servers can be reserved as the Type B vacant servers 308. In some cases, the percentage of reserved vacant servers for each type can be 10%, 5%, 2%, 1%, or the like. The reserved vacant servers can ensure that tenant migration is consistently available for the bare-metal servers within environment 300.

The orchestrator 110 may further maintain one or more logs 310 to facilitate tenant migration. In some cases, the orchestrator 110 can track vacant servers among the Type A vacant servers 304 and/or the Type B vacant servers 308 in the log(s) 310 and may select an appropriate vacant server in response to receiving an indication of an impending reboot from one of the Type A occupied servers 302 and/or the Type A occupied servers 306 based on the log(s) 310. In some cases, the orchestrator 110 can track tenants hosted throughout the environment 300, in order to ensure that tenants with ongoing issues that trigger reboots in their hosts are unable to tie up too many resources within the environment 300 due to serial migrations.

FIG. 4A illustrates an example of a server log 400 that can be maintained by an orchestrator (e.g., orchestrator 110) in order to efficiently identify vacant bare-metal servers available for migration.

The server log 400 includes multiple entries that respectively correspond to multiple servers in one or more data centers. Each of the entries may have at least three different fields: a server type 402, a server identifier 404, and tenant information 406.

The server type 402 may indicate a size, class, or category to which the server belongs. For instance, in the example illustrated in FIG. 4A, servers with identifiers 1 to 4 are "Type A" (e.g., corresponding to a first range of processing capabilities and/or memory capacity) and servers with identifiers 5 to 8 are "Type B" (e.g., corresponding to second range of processing capabilities and/or memory capacity).

The server identifier 404 may indicate an identifier of the particular server corresponding to the entry. In some cases, the server identifier 404 may indicate a unique identifier for the server within the data center(s), such as a unique number, a unique string, or the like. In certain examples, the server identifier 404 includes address information (e.g., an IP address of the server, a MAC address of the server, routing information associated with communication between the orchestrator and the server, or the like).

The tenant information 406 may indicate whether the server is occupied. For instance, as illustrated in FIG. 4A, the servers with identifiers 3, 4, 7, and 8 are vacant or unoccupied. The tenant information 406 may further indicate which tenant is occupying the server. In the example illustrated in FIG. 4A, the servers with identifiers 1, 2, 5, and 6 are occupied, respectively, with tenants 1, 2, 3, and 4.

In various implementations, the server log 400 can be utilized to identify a vacant server that can accommodate a tenant. For instance, if an impending reboot is indicated for the server with Identifier 1, hosting Tenant 1 and which is of Type A, the server with Identifier 3 can be identified as a vacant server with the same type (Type A) that can host Tenant 1.

The server log 400 may be updated when a tenant is migrated from one server to another server. For example, if Tenant 1 is migrated from the server with Identifier 1 to the server with Identifier 3, the tenant information for the server with Identifier 1 can be changed to "VACANT" and the tenant information for the server with Identifier 3 can be changed to "Tenant 1."

FIG. 4B illustrates an example of a tenant log 408 that can be maintained by an orchestrator (e.g., orchestrator 110) in order to efficiently identify tenants that should not be migrated.

The tenant log 408 includes multiple entries that respectively correspond to multiple tenants hosted on multiple servers in one or more data centers. Each of the entries may have at least four different fields: a tenant identifier 410, a last migration time 412, a last host server 414, and a migration status 416.

The tenant identifier 410 may include unique information to each tenant hosted in the data center(s). For example, a tenant identifier 410 can include a number, a string, or a combination thereof. In some cases, the tenant identifier 410 field can include an IP address, a MAC address, routing information, or the like.

The last migration time 412 can track the time at which each tenant was last migrated. In some cases, a tenant may cause a crash that leads to a reboot trigger. Accordingly, even if the tenant is migrated to a new server, the tenant may subsequently cause the new server to crash as well. Without restrictions on the tenant's ability to migrate to new servers, the tenant may render an unacceptable number of servers within the data center(s) unusable due to serial reboots and migrations. By tracking the last migration time 412, the orchestrator can ensure that serial reboot tenants are not migrated to other servers within the data center(s). For instance, the orchestrator may refrain from facilitating the migration of any tenant that has previously migrated within a particular time frame (e.g., a day, 8 hours, 2 hours, or the like). In various examples, the orchestrator may refrain from facilitating the migration of a tenant whose last migration occurred less earlier than a threshold time ago (e.g., one day ago).

The last host server 414 can indicate an identifier of a previous server on which the tenant was hosted. In various implementations, the identifier may uniquely identify a bare-metal server within a particular availability zone.

The migration status 416 may indicate whether a previous migration of the tenant was successful. If a previously attempted migration was unsuccessful for a particular tenant (e.g., Tenant 4), the orchestrator may permit another attempted migration even if the corresponding last migration time 412 was relatively recent (e.g., within the particular time frame). In some cases, the orchestrator may use both the last host server 414 and the migration status 416 to identify whether some servers (e.g., the server with Identifier 6) are unlikely to successfully perform tenant migration, and may restrict future migrations to those servers.

In various implementations, the tenant log 408 can be updated after a tenant is migrated. For instance, if Tenant 1 is migrated at Time 5, which is after Time 1, the last migration time 412 field of the entry corresponding to Tenant 1 can be updated to "Time 5." In addition, if Tenant 1 is migrated from a server with Identifier 1 to a server with Identifier 4, the last host server 414 field can be updated to "Identifier 1." If the migration of Tenant 1 is unsuccessful, the migration status 416 field could be updated to "Failed."

Although not illustrated in FIG. 4B, in some cases, each of the entries in the tenant log 408 can further include a counter. The counter may indicate the number of times that the corresponding tenant has been migrated, or that servers hosting the corresponding tenant have been rebooted, within a predetermined time period. For instance, the counter associated with Tenant 1 may indicate the number of times that Tenant 1 has been migrated in the past 48 hours. In some cases, the counter may be incremented in response to the corresponding tenant being migrated. For instance, when Tenant 1 is migrated to a new bare-metal server, the counter may be increased by one. In some examples, the counter may be incremented in response to a lapse of time. For example, when a migration indicated by the counter is older than the predetermined time period, the counter may be incremented down by one.

Figure 5:
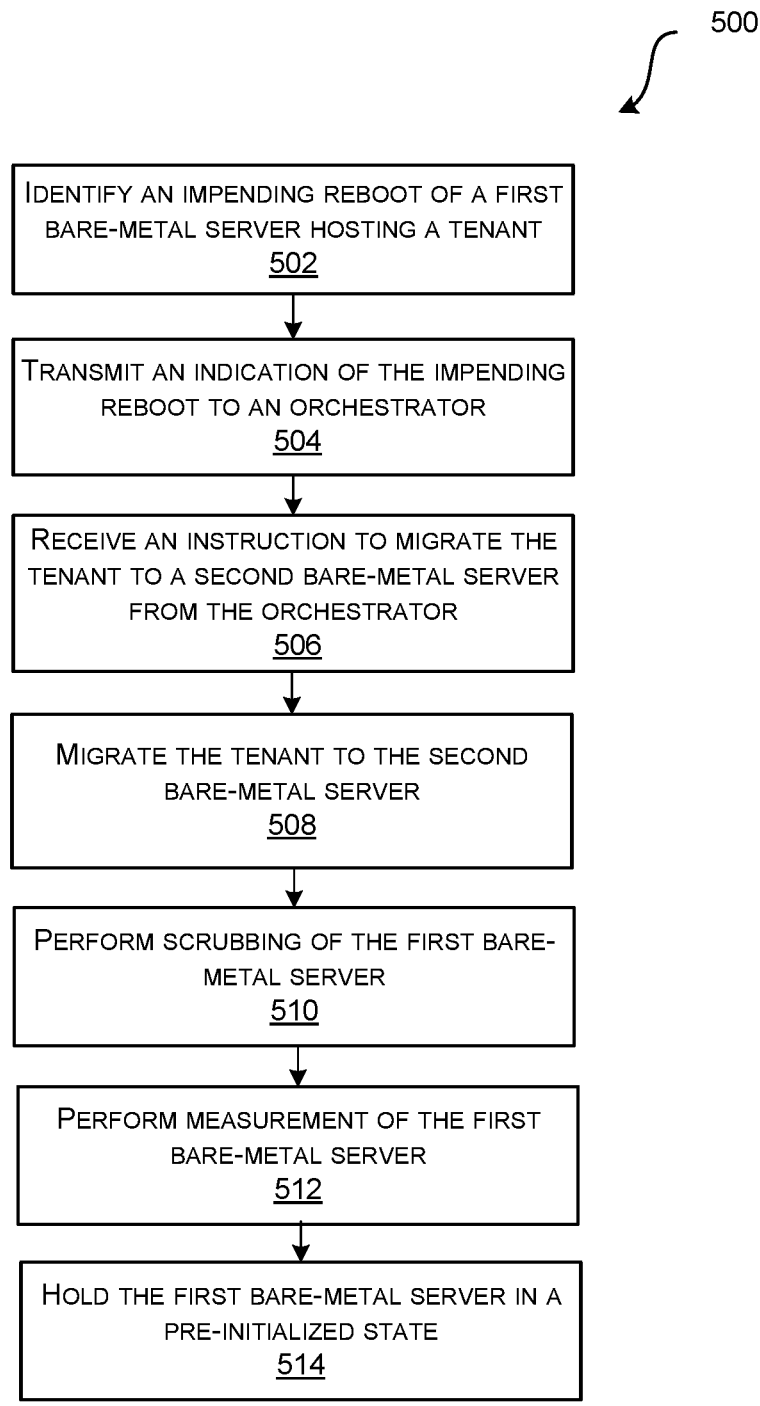
FIG. 5 illustrates an example process for migrating a tenant from a first bare-metal server to a second bare-metal server. The process illustrated in FIG. 5 can be performed by the first bare-metal server, in some examples.
Figure 6:
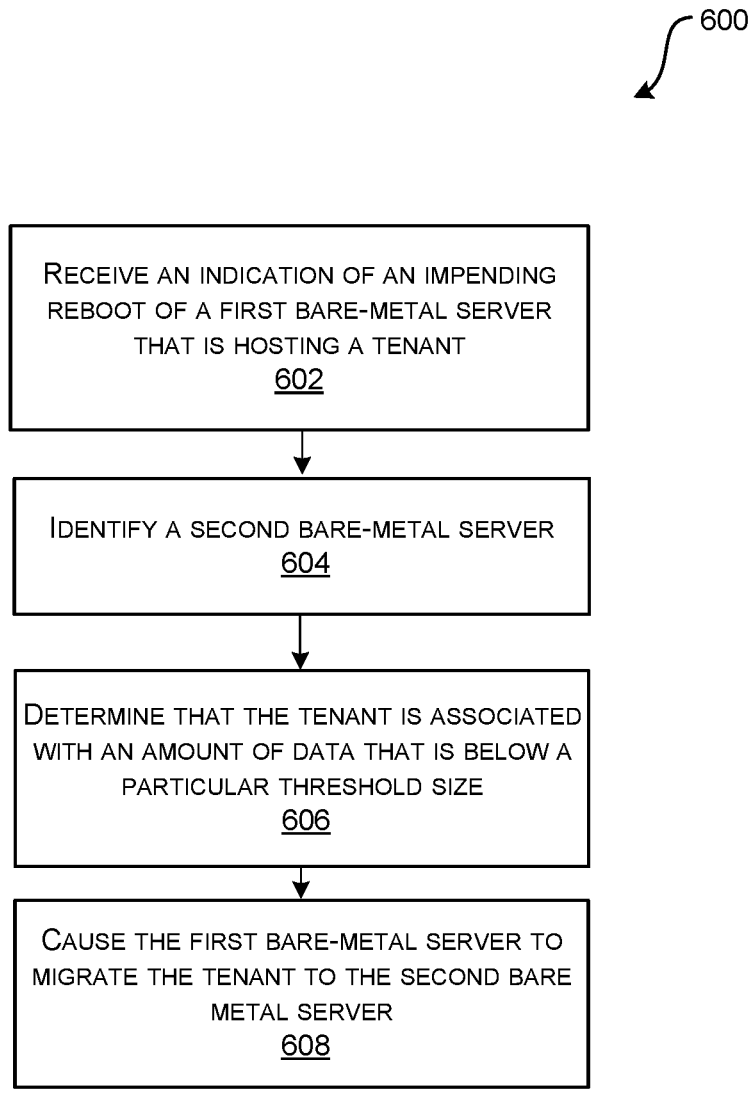
FIG. 6 illustrates another example process for migrating a tenant from a first bare-metal server to a second bare-metal server. The process illustrated in FIG. 6 can be performed by an orchestrator connected to the first bare-metal server and the second bare-metal server, in some examples.
Figure 7:
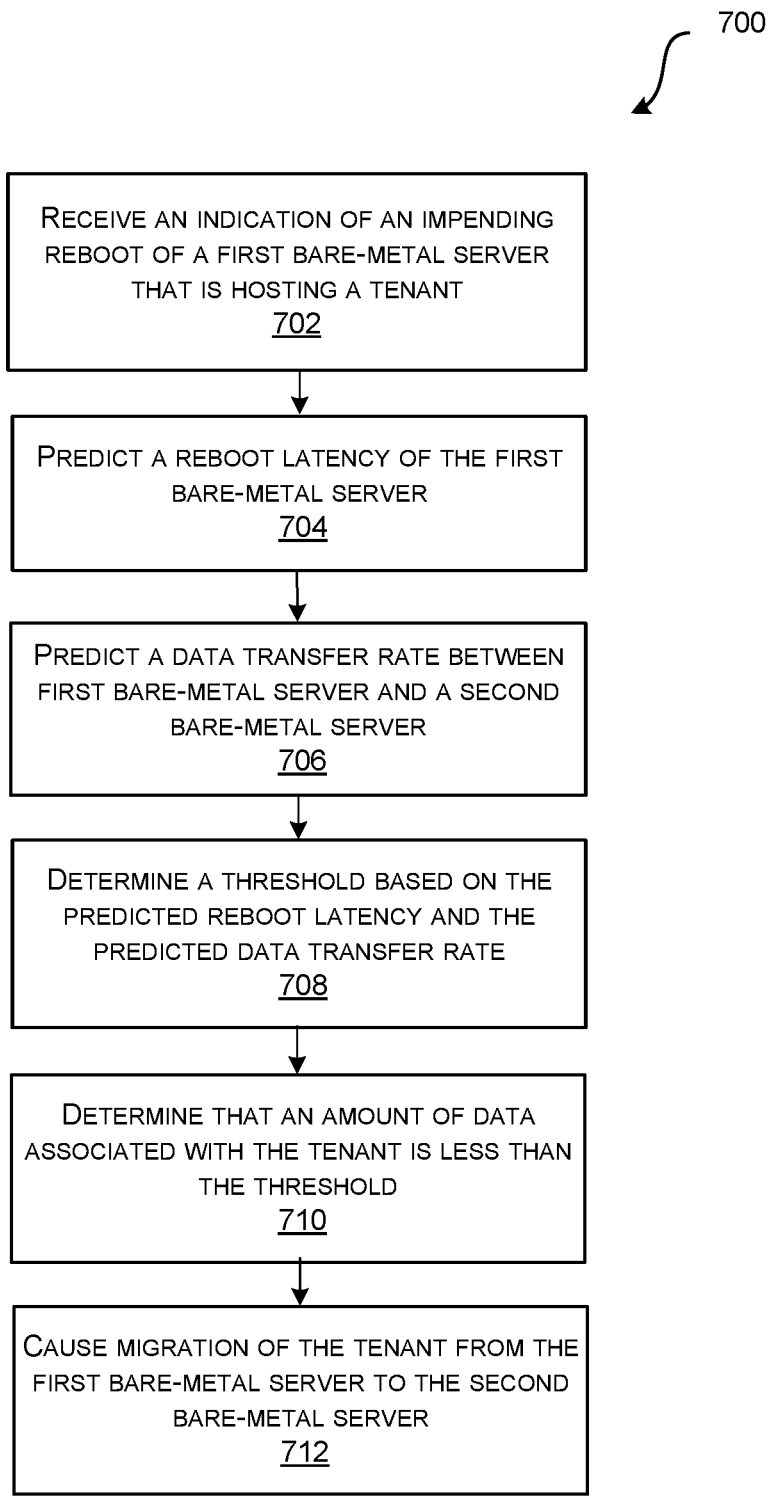
FIG. 7 illustrates yet another example process for migrating a tenant from a first bare-metal server to a second bare-metal server. The process illustrated in FIG. 7 can be performed by an orchestrator connected to the first bare-metal server and the second bare-metal server, in some examples.

FIGS. 5-7 illustrate example processes performed by various systems and devices disclosed herein. Although the example processes are each illustrated in a particular order, the processes can be performed in other orders according to various implementations.

FIG. 5 illustrates an example process 500 for migrating a tenant from a first bare-metal server to a second bare-metal server. In various implementations, process 500 can be performed by a bare-metal server, such as the occupied bare-metal server 104 described above with reference to FIGS. 1, 2A, 2B, and 3.

At 502, an impending reboot of the first bare-metal server is identified. In some instances, the impending reboot may be identified when software running in the first bare-metal server (e.g., a software application, an operating system, or the like) has crashed. In some examples, the impending reboot may be identified when a command to perform the reboot has been received from a user device (e.g., user device 114). In various implementations, the first bare-metal server may temporarily refrain from performing the reboot after identifying that the reboot has been triggered. The first bare-metal may be currently hosting a tenant.

At 504, an indication of the impending reboot is transmitted to an orchestrator. For instance, the indication may be transmitted in the form of a data packet over at least one internal network in a data center environment. In some cases, the internal network(s) may be an internal service provider network. In some example implementations, the indication of the impending reboot may further identify at least one of the first bare-metal server, the tenant hosted by the first bare-metal server, various capabilities of the first bare-metal server (e.g., memory capacity, processing capabilities, etc.), an amount of data associated with the tenant (e.g., in the form of state information and/or data stored in a local storage of the first bare-metal server), or the like.

In some cases, the orchestrator is hosted on at least one device within the data center environment. For instance, the orchestrator may be executed by a server in the same data center as the first bare-metal server, the same data center as the second bare-metal server, or another data center in the same availability zone as the first bare-metal server and the second bare-metal server.

At 506, an instruction to migrate the tenant to a second bare-metal server is received from the orchestrator. The second bare-metal server may be a vacant server that is not currently hosting a tenant. In some implementations, the second bare-metal server may be located in the same data enter as the first bare-metal server or a different data center in the same availability zone as the data center of the first bare-metal server.

In some particular examples, the second bare-metal server may have at least similar capabilities to the first bare-metal server. A memory capacity of the second bare-metal server may be equivalent to the memory capacity to the first bare-metal server. For instance, the second bare-metal server may be capable of storing the same amount of information as the first bare-metal server, a greater amount of information as the first bare-metal server, or may be capable of storing an amount of information that is within a predetermined range of the amount of information that the first bare-metal server is capable of storing. A processing capability of the second bare-metal server may be equivalent to the processing capability of the first bare-metal server. For example, a processing capability (e.g., CPU clock rate, CPU cache capacity, number of CPUs, etc.) of the second bare-metal server may be the same, greater, or within a predetermined range of the processing capability of the first bare-metal server. In some cases, the first bare-metal server and the second bare-metal server may have been manufactured by the same vendor.

In various instances, the second bare-metal server may be pre-initialized. For instance, the second bare-metal server may be pre-scrubbed and held in a pre-enumerationed state that allows the second bare-metal server to accept and execute a tenant without performing a reboot of its own.

In various examples, the instruction to migrate the tenant may be an instruction to migrate the tenant through the orchestrator or directly to the second bare-metal server. In some cases, the first bare-metal server may identify the second bare-metal server, connect to the second bare-metal server, and establish a peer-to-peer connection with the second bare-metal server based on the instruction. For instance, the instruction may include an address (Internet Protocol (IP) address, Media Access Control (MAC) address, etc.) and/or routing information enabling the first bare-metal server to establish the peer-to-peer connection with the second bare-metal server.

At 508, the tenant is migrated to the second bare-metal server. In various implementations, data associated with the tenant is transmitted from the first bare-metal server to the second bare-metal server. The data may include state information (e.g., clock state, Complementary Metal Oxide Semiconductor (CMOS) block setting, BIOS setting, or the like) associated with the tenant. In some cases, the data may include data stored in a local storage of the first bare-metal server that is associated with the tenant.

In some cases, the data is transmitted via the orchestrator. For example, the first bare-metal server may transmit the data associated with the tenant to the orchestrator over an existing communication interface between the first bare-metal server and the orchestrator. The orchestrator may forward the data associated with the tenant to the second bare-metal server over an existing communication interface between the orchestrator and the second bare-metal server.

In some examples, the data is transmitted via a peer-to-peer connection between the first bare-metal server and the second bare-metal server. In some cases, the first bare-metal server may establish the peer-to-peer connection and transmit the data associated with the tenant to the second bare-metal server over the established peer-to-peer connection.

Subsequently, the reboot of the first bare-metal server may be at least partially performed. In various implementations, the reboot may be performed after the tenant has migrated to the second bare-metal server, to ensure that the reboot does not interrupt the functioning of the tenant. For instance, the reboot of the first bare-metal server may be initiated in response to receiving a confirmation, from the orchestrator, that the tenant has been successfully migrated to the second bare-metal server. If the confirmation is not received within a predetermined time, or a message indicating that the migration has failed is received from the orchestrator, the first bare-metal server may either reboot without scrubbing the data associated from the tenant or continue to hold the reboot until the data associated with the tenant can be transferred to an alternate bare-metal server. The reboot may include a multi-step process.

At 510, the reboot may include a process of scrubbing the first bare-metal server. In various implementations, the existing tenant data and associated state may be deleted from the first bare-metal server. Accordingly, the previous tenancy of the tenant on the first bare-metal server may not impact a subsequent tenant hosted by the first bare-metal server.

At 512, the reboot may include performing measurement of the first bare-metal server. During the measurement process, the first bare-metal server may be inspected for potentially malicious data left behind by the tenant. During measurement, various components of the bare-metal server, such as components in firmware and/or the Basic-Input and Output System (BIOS), are measured to ensure that a previous host has not altered the components with malicious code. If the previous host has altered the components with potentially malicious code, the reboot may include an additional scrubbing process to reset the components back to their original settings.

At 514, the first bare-metal server may be held in a pre-initialized state. In some cases, the first bare-metal server may be held in a pre-enumerationed state. Accordingly, the first bare-metal server may be ready to accept and execute a new tenant without performing another reboot process.

FIG. 6 illustrates another example process 600 for migrating a tenant from a first bare-metal server to a second bare-metal server. In various implementations, process 600 can be performed by an orchestrator, such as the orchestrator 110 described above with reference to FIGS. 1, 2A, 2B, and 3.

At 602, an indication of an impending reboot of a first bare-metal server hosting a tenant is received. The indication may be received from the control plane, such as from a controller, or from the first bare-metal server itself. For instance, the indication may be transmitted in the form of a data packet over at least one internal network in a data center environment. In some cases, the internal network(s) may be an internal service provider network. In some example implementations, the indication of the impending reboot may further identify at least one of the first bare-metal server, the tenant hosted by the first bare-metal server, various capabilities of the first bare-metal server (e.g., memory capacity, processing capabilities, etc.), or the like. In various examples, the indication may indicate an amount of data associated with the tenant (e.g., in the form of state information and/or data stored in a local storage of the first bare-metal server). In some cases, the indication may be received from the first bare-metal server, a controller, or a combination thereof.

In some cases, the orchestrator is hosted on at least one device within the data center environment. For instance, the orchestrator may be executed by a server in the same data center as the first bare-metal server, the same data center as the second bare-metal server, or another data center in the same availability zone as the first bare-metal server and the second bare-metal server.

At 604, the second bare-metal server is identified. The second bare-metal server may be a vacant server that is not currently hosting a tenant. In some implementations, the second bare-metal server may be located in the same data enter as the first bare-metal server or a different data center in the same availability zone as the data center of the first bare-metal server. According to various examples, the second bare-metal server may be identified by referencing a server log (e.g., server log 400) indicating various bare-metal servers in the data center environment.

In some particular examples, the second bare-metal server may have at least similar capabilities to the first bare-metal server. A memory capacity of the second bare-metal server may be equivalent to the memory capacity to the first bare-metal server. For instance, the second bare-metal server may be capable of storing the same amount of information as the first bare-metal server, a greater amount of information as the first bare-metal server, or may be capable of storing an amount of information that is within a predetermined range of the amount of information that the first bare-metal server is capable of storing. A processing capability of the second bare-metal server may be equivalent to the processing capability of the first bare-metal server. For example, a processing capability (e.g., CPU clock rate, CPU cache capacity, number of CPUs, etc.) of the second bare-metal server may be the same, greater, or within a predetermined range of the processing capability of the first bare-metal server. In some cases, the first bare-metal server and the second bare-metal server may have been manufactured by the same vendor.

In various instances, the second bare-metal server may be pre-initialized. For instance, the second bare-metal server may be pre-scrubbed and held in a pre-enumerationed state that allows the second bare-metal server to accept and execute a tenant without performing a reboot of its own.

At 604, data associated with the tenant is determined to be below a particular threshold size. In some cases, the threshold may be a static threshold defined in the orchestrator for all examples of migration. In various implementations, the threshold may be dynamically calculated based on the amount of data associated with the tenant and/or conditions of the network. For instance, a reboot latency of the first bare-metal server may be predicted, a data transfer rate between the first bare-metal server and the second bare-metal server may be predicted, and the predicted reboot latency and the predicted data transfer rate may be multiplied together to produce the threshold. Accordingly, the tenant may be selectively migrated when it can be fully transferred faster than the first bare-metal server can reboot.

At 608, the process 500 includes causing the first bare-metal server to migrate the tenant to the second bare-metal server. In some cases, 608 includes transmitting a request to transmit the data associated with the tenant to the orchestrator. The data may include state information (e.g., clock state, Complementary Metal Oxide Semiconductor (CMOS) block setting, BIOS setting, or the like) associated with the tenant. In some cases, the data may include data stored in a local storage of the first bare-metal server that is associated with the tenant. For example, the first bare-metal server may transmit the data associated with the tenant to the orchestrator over an existing communication interface between the first bare-metal server and the orchestrator. The orchestrator may forward the data associated with the tenant to the second bare-metal server over an existing communication interface between the orchestrator and the second bare-metal server.

In some examples, an instruction to transfer the data via a peer-to-peer connection to the second bare-metal server is transmitted to the first bare-metal server. In some cases, the first bare-metal server may establish the peer-to-peer connection and transmit the data associated with the tenant to the second bare-metal server over the established peer-to-peer connection.

FIG. 7 illustrates another example process 700 for migrating a tenant from a first bare-metal server to a second bare-metal server. In various implementations, process 700 can be performed by an orchestrator, such as the orchestrator 110 described above with reference to FIGS. 1, 2A, 2B, and 3.

At 702, an indication of an impending reboot of the first bare-metal server can be received. In some cases, the indication can be received from the first bare-metal server, a controller, or a combination thereof. The first bare-metal server may be hosting a tenant. For instance, the indication may be transmitted in the form of a data packet over at least one internal network in a data center environment. In some cases, the internal network(s) may be an internal service provider network. In some example implementations, the indication of the impending reboot may further identify at least one of the first bare-metal server, the tenant hosted by the first bare-metal server, various capabilities of the first bare-metal server (e.g., memory capacity, processing capabilities, etc.), or the like. In various examples, the indication may indicate an amount of data associated with the tenant (e.g., in the form of state information and/or data stored in a local storage of the first bare-metal server).

In some cases, the orchestrator is hosted on at least one device within the data center environment. For instance, the orchestrator may be executed by a server in the same data center as the first bare-metal server, the same data center as the second bare-metal server, or another data center in the same availability zone as the first bare-metal server and the second bare-metal server.

At 704, a reboot latency of the first bare-metal server is predicted. The reboot latency may correspond to the time the first bare-metal server will take to perform the reboot. The reboot latency may be predicted based on historical trends. For instance, the orchestrator may have monitored a previous reboot latency of the first bare-metal server and may predict that the next reboot latency will be equivalent to the previous reboot latency. In some cases, the reboot latency may be predicted based on one or more instance-related metrics including at least one of a memory capacity of the first bare-metal server, an operating system of the first bare-metal server, a vendor of the bare-metal server, or the like. For instance, a server with a greater memory capacity may take longer to reboot than a server with a smaller memory capacity. The orchestrator may model the reboot latency based on historical trends associated with the first bare-metal server. For instance, the orchestrator may maintain a neural network that can be trained to predict the reboot latency of the first bare-metal server based on historical reboot latencies of the first bare-metal server and other instance-related metrics. In general, a majority of the reboot latency may depend on the time the first bare-metal server takes to perform measurement and hardware initialization.

At 706, a data transfer rate between the first bare-metal server and the second bare-metal server is predicted. In various implementations, the first bare-metal server and the second bare-metal server may be connected to each other by one or more communication networks. In some cases, the orchestrator itself connects the first bare-metal server to the second bare-metal server. The data transfer rate may be defined as an amount of data transferred over a network path from the first bare-metal server to the second bare-metal server during a period of time. The network path may include, for example, an interface between the first bare-metal server and the orchestrator and an interface between the orchestrator and the second bare-metal server. The orchestrator may estimate the data transfer rates across these interfaces based on prior communications with the first bare-metal server and the second bare-metal server. In some instances, the network path may include a peer-to-peer interface between the first bare-metal server and the second bare-metal server.

The orchestrator may identify the data transfer rate based on expected data transfer rates through the communication network(s) between the first bare-metal server, the second bare-metal server, and/or the orchestrator. In some cases, the data transfer rate can be estimated to be a minimum data transfer rate (e.g., previously observed by the orchestrator) through the communication network(s). In some cases, the orchestrator can predict the data transfer rate based on features of the first bare-metal server, the second bare-metal server, and/or the orchestrator. For instance, if the first bare-metal server is a Top of Rack (ToR) server, the orchestrator may predict that it will have a higher data transfer rate to the orchestrator or the second bare-metal server than if the first bare-metal server was an End of Row (EoR) server. In some cases, the orchestrator can maintain a model of the data transfer rate. The model may depend on at least one input, such as at least one of the type of the first bare-metal server, (e.g., ToR or EoR), a type of the second bare-metal server (e.g., a ToR or EoR), a type of the orchestrator (e.g., ToR or EoR), an available capacity in the communication network(s) (e.g., an amount of available bandwidth), a minimum data transfer rate through the communication network(s), a maximum data transfer rate through the communication network(s), or the like.

At 708, a threshold is determined based on the predicted reboot latency and the predicted data transfer rate. The threshold may be a threshold amount of data (e.g., a number of bytes). According to various implementations, the threshold can be calculated by multiplying the predicted reboot latency and the predicted data transfer rate. In some cases, the threshold can be less than (e.g., by a particular buffer amount, such as 100 MB) the product of the predicted reboot latency and the predicted data transfer rate. The product may represent an amount of data that could be transferred from the first bare-metal server to the second bare-metal server in the time it should take for the first bare-metal server to reboot.

At 710, an amount of data associated with the tenant is determined to be less than the threshold. In various implementations, the amount of data associated with the tenant is compared to the threshold. Because the amount of data is less than or equal to the threshold, the predicted time to transfer the data from the first bare-metal server to the second bare-metal server is less than the predicted time of the reboot of the first bare-metal server. In some embodiments, it may be determined that the predicted amount of time to transfer the data from the first bare-metal server to the second bare-metal server is at least a threshold amount of time that is less than the predicted reboot latency for the first bare-metal server.

At 712, the process 700 includes causing migration of the tenant from the first bare-metal server to the second bare-metal server. In some cases, 712 includes transmitting a request to transmit the data associated with the tenant to the orchestrator. The data may include state information (e.g., clock state, Complementary Metal Oxide Semiconductor (CMOS) state, or the like) associated with the tenant. In some cases, the data may include data stored in a local storage of the first bare-metal server that is associated with the tenant. For example, the first bare-metal server may transmit the data associated with the tenant to the orchestrator over an existing communication interface between the first bare-metal server and the orchestrator. The orchestrator may forward the data associated with the tenant to the second bare-metal server over an existing communication interface between the orchestrator and the second bare-metal server.

In some examples, an instruction to transfer the data via a peer-to-peer connection to the second bare-metal server is transmitted to the first bare-metal server. In some cases, the first bare-metal server may establish the peer-to-peer connection and transmit the data associated with the tenant to the second bare-metal server over the established peer-to-peer connection.

Figure 8:
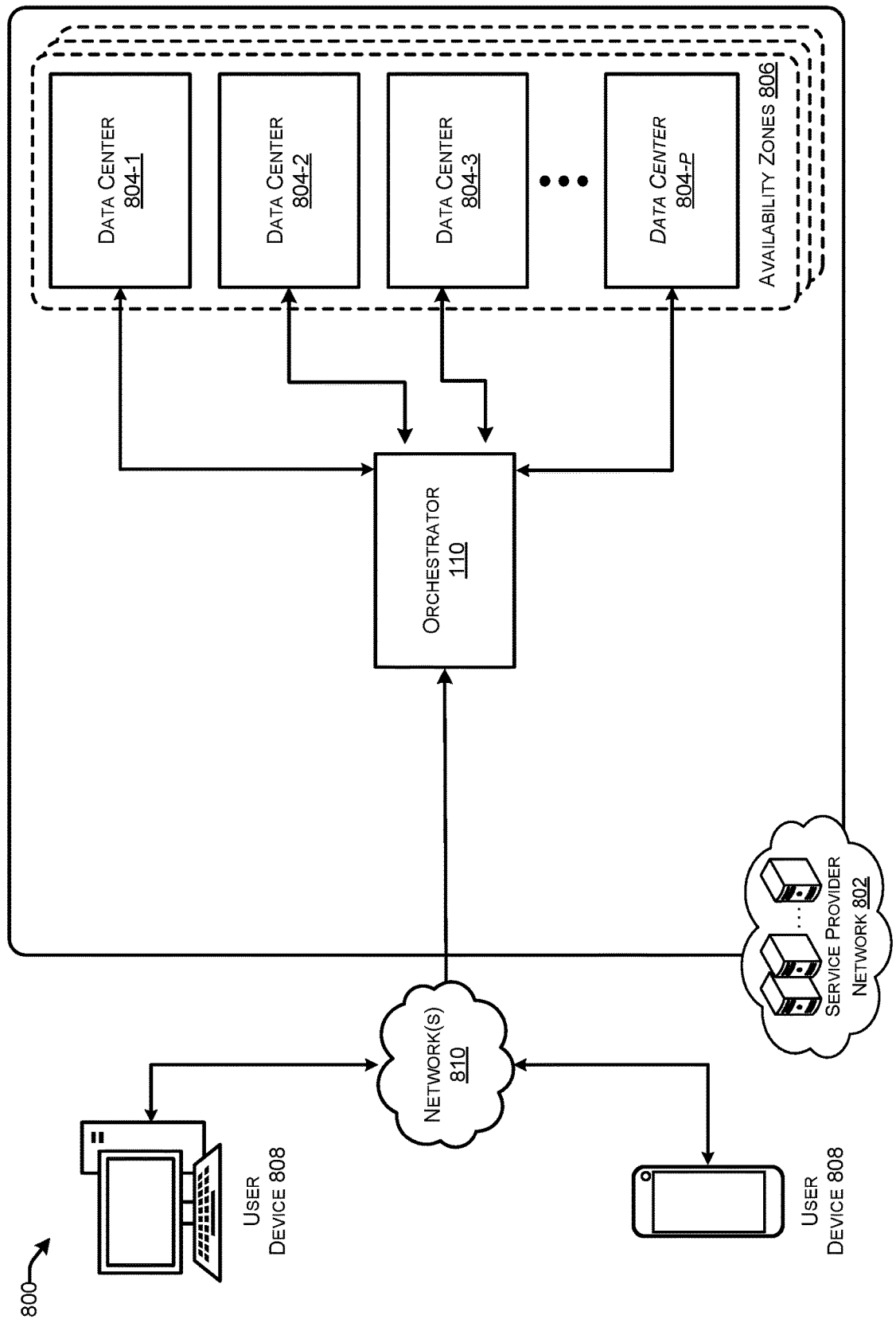
FIG. 8 is a system and network diagram that shows an illustrative operating environment including a service provider network that can be configured to implement aspects of the functionality described herein.

FIG. 8 is a system and network diagram showing an illustrative operating environment 800 that includes a service provider network 802, which can be configured to implement aspects of various functionalities described herein. The service provider network 802 can provide computing resources, like Virtual Machine (VM) instances and storage, on a permanent or an as-needed basis.

Among other types of functionality, the computing resources provided by the service provider network 802 may be utilized to implement various services described above. For instance, the computing resources provided by the service provider network 802 can include various types of computing resources, such as data processing resources like VM instances, data storage resources, networking resources, data communication resources, network services, and the like. In some cases, the computing resources are provided via bare-metal servers within the service provider network 802.

Each type of computing resource provided by the service provider network 802 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 802 can also be configured to provide other types of computing resources not mentioned specifically herein.

The computing resources provided by the service provider network 802 may be enabled in some implementations by one or more data centers 804-1 to 804-$p$, wherein p is a positive integer. The data center(s) 804-1 to 804-$p$ might be referred to herein singularly as "a data center 804" or in the plural as "the data centers 804"). The data centers 804 are facilities utilized to house and operate computer systems and associated components. The data centers 804 can include redundant and backup power, communications, cooling, and security systems. The data centers 804 can also be located in geographically disparate locations, or regions. One region may include multiple availability zones 806. A region can be defined as a geographical area in which the cloud provider network 802 clusters data centers 804. Each region can include two or more availability zones 806 connected to one another via a private high-speed network, for example a fiber communication connection. An availability zone can refer to an isolated failure domain including one or more data center facilities with separate power, separate networking, and separate cooling from those in another availability zone. In some cases, availability zones 806 within a region may be positioned far enough away from one other that the same natural disaster should not take more than one availability zone 806 offline at the same time. One illustrative embodiment for a data center 804 that can be utilized to implement the technologies disclosed herein will be described below with regard to FIG. 9.

Various user devices 808 that utilize the service provider network 802 may access the computing resources provided by the service provider network 802 over any wired and/or wireless network(s) 810, which can be a Wide Area Network (WAN), such as the Internet, an intranet or an Internet Service Provider (ISP) network or a combination of such networks. In some cases, network(s) 810 may include a cloud-based network. In some examples, without limitation, a user device 808 operated by a client of the service provider network 802 may be utilized to access the service provider network 802 by way of the network(s) 810. It should be appreciated that a Local Area Network (LAN), the Internet, or any other networking topology known in the art that connects the data centers 804 to remote clients and other users can be utilized. It should also be appreciated that combinations of such networks can also be utilized.

In particular implementations, the user device 808 may utilize resources of a bare-metal server in a first data center 804-1 among the data centers 804 via a tenant hosted on the bare-metal server. The bare-metal server may identify a pending reboot. The bare-metal server may notify the orchestrator 110 of the impending reboot. In response, the orchestrator 110 may identify a vacant bare-metal server in the same data center 804-1 or in a different data center 804 within the same availability zone 806 as the first data center 804-1. For instance, the vacant bare-metal server may be in a second data center 804-2. The orchestrator 110 may cause the tenant to migrate from the original bare-metal server to the vacant bare-metal server. The original bare-metal server may perform the reboot after the tenant is migrated. As a result, the user device 808 may experience a minimal delay to the utilization of the resources via the tenant, which may be due to the transfer of data associated with the tenant from the first bare-metal server to the second bare-metal server through the service provider network 802. The delay experienced by the user device 808 may be shorter than a delay that would be associated with a reboot, had the tenant not been migrated from the rebooting bare-metal server.

In some cases, although not specifically illustrated in FIG. 8, at least a portion of the orchestrator 110 can be hosted by one or more of the data centers 804. For instance, the orchestrator 110 may be hosted by one of the data centers 1004 in relatively close geographical proximity to the user device 808. In some cases, the orchestrator 110 may be configured to migrate multiple tenants between multiple bare-metal servers in the same availability zone 806, and may be hosted by one of the data centers 1004 in the same availability zone 806 as the bare-metal servers.

Figure 9:
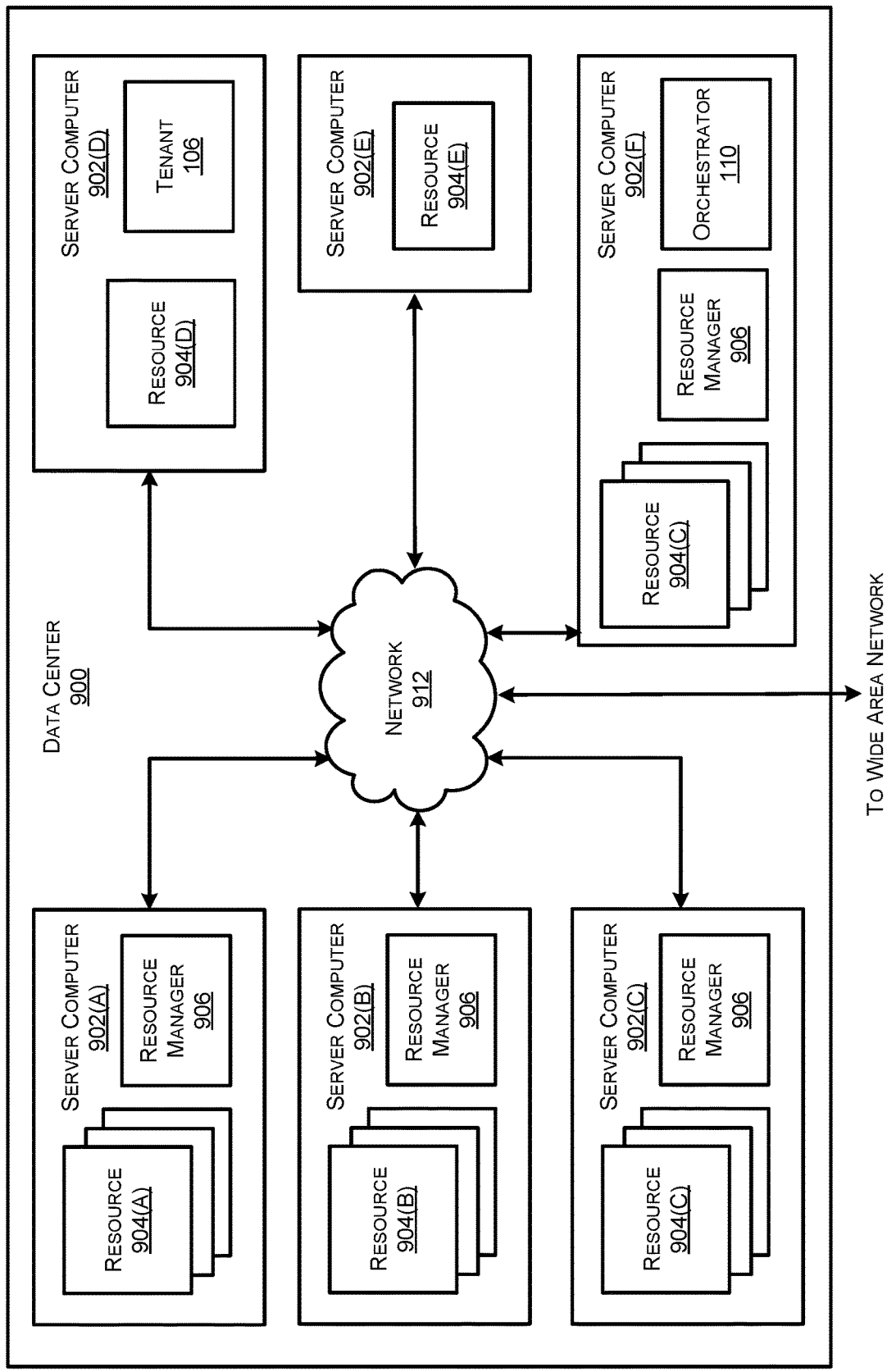
FIG. 9 is a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-02F (which might be referred to herein singularly as "a server computer 902" or in the plural as "the server computers 902") for providing computing resources 904A-904E. In some examples, the resources 904 and/or server computers 902 may include, be included in, or correspond to, the computing resource network 802 described above with reference to FIG. 8.

The server computers 902 can be standard tower, rack-mount, or blade server computers configured appropriately for providing the computing resources described herein (illustrated in FIG. 9 as the computing resources 904A-904E). As mentioned above, the computing resources provided by the service provider network 1102 can be data processing resources such as Virtual Machine (VM) instances or hardware computing systems, database clusters, computing clusters, storage clusters, data storage resources, database resources, networking resources, and others. Server computers 902 in the data center 900 can also be configured to provide network services and other types of services.

Some of the servers 902 (i.e., server computers 902A-902C and 902F) can also be configured to execute a resource manager 1106 capable of instantiating and/or managing the computing resources. In the case of VM instances, for example, the resource manager 906 can be a hypervisor or another type of program configured to enable the execution of multiple VM instances on a single server computer 902.

At least some of the servers 902 (i.e., server computers 902D and 902E) may be bare-metal servers. Each one of the bare-metal servers may be a single physical server that is configured to host a single tenant (e.g., a VM instance) at a given time. For instance, server computer 902(D) is a bare-metal server that is hosting a tenant 110 and server computer 902E is a bare-metal server that is not currently hosting a tenant. Accordingly, the server computers 902D and 902E may lack, or refrain from executing, the resource manager 1106 or other type of hypervisor.

At least one of the servers 902 (i.e., server computer 902F) may further execute an orchestrator 110. The orchestrator 110 may manage migration of tenants between bare-metal servers within the data center 900, and in some cases, tenants between other bare-metal servers in other data centers in the same availability zone as data center 900 are also managed by the orchestrator 110.

In the example data center 900 shown in FIG. 9, an appropriate cloud-based network 912 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804-1 to 804-*p* (described above with reference to FIG. 8), between each of the server computers 902A-902F in the data center 900, and, potentially, between computing resources in each of the server computers 902A to 902C configured to host multiple tenants. It should be appreciated that the configuration of the data center 900 described with reference to FIG. 9 is merely illustrative and that other implementations can be utilized.

Server computer 902F can execute some or all of the software components described above. For example, and without limitation, the server computer 902F can implement the orchestrator 110. The server computer 902F can also be configured to execute other components and/or to store data (e.g., log(s) 310) for providing some or all of the functionality described herein. In this regard, it should be appreciated that the services illustrated in FIG. 9 as executing on the server computer 902F can execute on many other physical or virtual servers in the data centers 804 in various embodiments.

Figure 10:
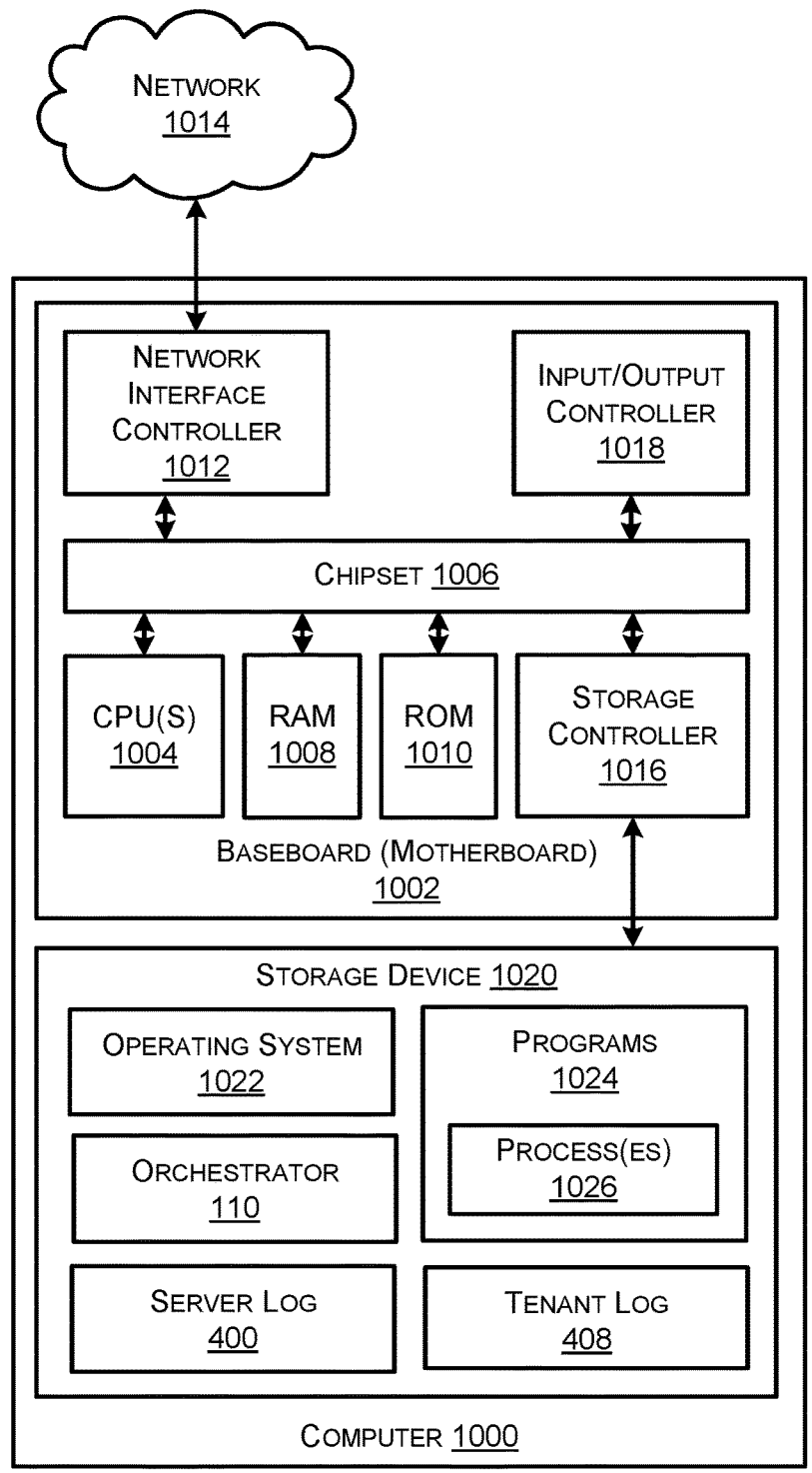
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more Central Processing Units (CPUs) 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a Read-Only Memory (ROM) 1010 or Non-Volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network 1014. In various implementations, the network 1014 can include at least one of a cloud-based network, a Local Area Network (LAN), or a Wide Area Network (WAN). The chipset 1006 can include functionality for providing network connectivity through a Network Interface Controller (NIC) 1012, such as a gigabit Ethernet adapter. The NIC 1012 is capable of connecting the computer 1000 to other computing devices over the network 1014. It should be appreciated that multiple NICs 1012 can be present in the computer 1000, connecting the computer 1000 to other types of networks and remote computer systems.

The computer 1000 can also include one or more input/output controllers 1018 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device.

The computer 1000 can include and/or be connected to a mass storage device 1020 that provides non-volatile storage for the computer. The mass storage device 1020 can store an operating system 1022, programs 1024 (e.g., processes 1026), as well as the orchestrator 110, server log 400, tenant log 410, and data, which have been described in greater detail herein. The mass storage device 1020 can be connected to the computer 1000 through a storage controller 1016 connected to the chipset 1006. The mass storage device 1020 can consist of one or more physical storage units. The storage controller 1016 can interface with the physical storage units through a Serial attached SCSI (SAS) interface, a Serial Advanced Technology Attachment (SATA) interface, a Fiber Channel (FC) interface, or other type of interface for physically connecting and transferring data between computers and physical storage units.

The computer 1000 can store data on the mass storage device 1020 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the computer 1000 can store information to the mass storage device 1020 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1020 by detecting the physical states or characteristics of one or more particular locations within the physical storage units.

In addition to the mass storage device 1020 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 802 described above with reference to FIG. 8, and or any components included therein, may be supported by one or more devices similar to computer 1000. Stated otherwise, some or all of the operations performed by the service provider network 802, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1020 can store an operating system 1022 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1020 can store other system or application programs and data utilized by the computer 1000.

In one embodiment, the mass storage device 1020 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1 to 7. The computer 1000 can also include computer-readable storage media having instructions stored thereupon for performing any of the other computer-implemented operations described herein.

It will be appreciated that the computer 1000 might not include all of the components shown in FIG. 10, can include other components that are not explicitly shown in FIG. 10, or might utilize an architecture completely different than that shown in FIG. 10.

Further, in some implementations, the computer 1000 may correspond to a bare-metal server configured to host a single tenant at a time. In some examples in which the computer 1000 is a bare-metal server, the orchestrator 110, server log 400, and the tenant log 408 may be omitted from the computer 1000. In some cases in which the computer 1000 is a bare-metal sever currently hosting a tenant, data associated with the tenant may be stored in the storage device 1020. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more processors; and memory storing computer-executable instructions that, when executed, cause the one or more processors to perform operations comprising:

receiving, by an orchestrator that facilitates transfer of first data between multiple bare-metal servers, an indication of an impending reboot of an occupied bare-metal server among the multiple bare-metal servers;

determining that a time since a last migration associated with a tenant hosted by the occupied bare-metal server is equal to or greater than a threshold time; and based on determining that the time since the last migration is equal to or greater than the threshold time:

determining that second data associated with the tenant is less than a threshold amount of data;

identifying a first memory capacity of local memory of the occupied bare-metal server and a first processing capability of the occupied bare-metal server;

identifying a vacant bare-metal server among the multiple bare-metal servers with a second memory capacity that is within a first threshold amount of the first memory capacity of the occupied bare-metal server and with a second processing capability that is within a second threshold amount of the first processing capability of the occupied bare-metal server;

determining that the vacant bare-metal server is in a pre-enumerationed state indicating that the vacant bare-metal server is at least partially rebooted;

determining, based on the second memory capacity and the second processing capability, that the vacant bare-metal server is capable of hosting the second data associated with the tenant;

transmitting, to the occupied bare-metal server, a first instruction to initiate migration of the second data associated with the tenant from the occupied bare-metal server to the vacant bare-metal server;

receiving, from the occupied bare-metal server and at a first time that is prior to a second time of the impending reboot, the second data associated with the tenant;

transmitting, to the vacant bare-metal server, the second data associated with the tenant;

receiving a confirmation that the tenant has been successfully migrated to the vacant bare-metal server; and in response to receiving the confirmation, transmitting, to the occupied bare-metal server, a second instruction to initiate the impending reboot.

2. The system of claim 1, wherein the operations further comprise:

determining a predicted reboot latency of the occupied bare-metal server;

determining a predicted data transfer rate along at least one network path including a first interface from the occupied bare-metal server to the orchestrator over the at least one network path and a second interface from the orchestrator to the vacant bare-metal server over the at least one network path; and multiplying the predicted reboot latency by the predicted data transfer rate to determine the threshold amount of data.

3. The system of claim 1, wherein the impending reboot is triggered without receiving user input from a user associated with the tenant.

4. A method comprising:

receiving an indication of an impending reboot of a first bare-metal server hosting a tenant;

determining that a time since a previous migration associated with the tenant is equal to or greater than a threshold time; and based on determining that the time since the previous migration is equal to or greater than the threshold time:

identifying a second bare-metal server in a pre-enumerationed state indicating that the second bare-metal server is at least partially rebooted;

causing the first bare-metal server to transfer data associated with the tenant to the second bare-metal server prior to initiation of the impending reboot;

receiving a confirmation that the tenant has been successfully migrated to the second bare-metal server; and in response to receiving the confirmation, transmitting, to the first bare-metal server, an instruction to initiate the impending reboot.

5. The method of claim 4, wherein the second bare-metal server in the pre-enumerationed state has performed scrubbing and measurement, the scrubbing and the measurement comprising a reboot of the second bare-metal server, and wherein causing the first bare-metal server to transfer the data further causes the second bare-metal server to perform enumeration.

6. The method of claim 4, wherein identifying the second bare-metal server comprises:

identifying at least one of a first processing capability of the first bare-metal server or a first memory capacity of the first bare-metal server; and determining that the second bare-metal server has at least one of a second processing capability that is within a first threshold amount of the first processing capability or a second memory capacity that is within a second threshold amount of the first memory capacity.

7. The method of claim 4, wherein the instruction is a first instruction, and wherein causing the first bare-metal server to transfer the data associated with the tenant to the second bare-metal server comprises:

transmitting, to the first bare-metal server, a second instruction to establish a peer-to-peer connection with the second bare-metal server, the second instruction including an identifier of the second bare-metal server.

8. The method of claim 4, wherein the instruction is a first instruction, and wherein causing the first bare-metal server to transfer the data associated with the tenant to the second bare-metal server comprises:

transmitting, to the first bare-metal server, a second instruction to initiate transfer of the data associated with the tenant;

receiving, from the first bare-metal server, state information associated with the tenant, the state information comprising at least one of a clock state, a Basic Input Output System (BIOS) system state, or a Complementary Metal Oxide Semiconductor (CMOS) block setting of the first bare-metal server hosting the tenant; and transmitting, to the second bare-metal server, the state information associated with the tenant.

9. The method of claim 8, wherein causing the first bare-metal server to transfer the data associated with the tenant to the second bare-metal server further comprises:

receiving, from the first bare-metal server, the data associated with the tenant, the data associated with the tenant being stored in a local memory of the first bare-metal server; and transmitting, to the second bare-metal server, the data associated with the tenant.

10. The method of claim 4, further comprising:

determining a predicted reboot duration of the first bare-metal server;

determining a predicted data transfer rate from the first bare-metal server to the second bare-metal server;

multiplying the predicted reboot duration by the predicted data transfer rate to determine a threshold amount of data; and determining that the data associated with the tenant is equal to or less than the threshold amount of data.

11. The method of claim 4, wherein the impending reboot is triggered by a user associated with the tenant.

12. The method of claim 4, wherein identifying the second bare-metal server comprises identifying that the second bare-metal server is vacant.

13. The method of claim 12, wherein identifying the second bare-metal server comprises selecting, among vacant bare-metal servers in a fleet of bare-metal servers, the second bare-metal server, the vacant bare-metal servers comprising at least a threshold percentage of the fleet of bare-metal servers.

14. A system comprising:

one or more processors; and memory storing computer-executable instructions that, when executed, cause the one or more processors to perform operations comprising:

receiving an indication of an impending reboot of a first bare-metal server hosting a tenant and residing in an availability zone;

determining that a time since a previous migration associated with the tenant is equal to or greater than a threshold time; and based on determining that the time since the previous migration is equal to or greater than the threshold time:

identifying a second bare-metal server that is in the availability zone and that is capable of hosting data associated with the tenant;

determining that the second bare-metal server is in a pre-enumerationed state indicating that the second bare-metal server is at least partially rebooted;

causing the first bare-metal server to transfer the data associated with the tenant to the second bare-metal server in advance of the impending reboot;

receiving a confirmation that the tenant has been successfully migrated to the second bare-metal server; and in response to receiving the confirmation, transmitting, to the first bare-metal server, an instruction to initiate the impending reboot.

15. The system of claim 14, wherein identifying the second bare-metal server comprises:

identifying a first processing capability of the first bare-metal server; and determining that the second bare-metal server has a second processing capability that is within a threshold amount of the first processing capability of the first bare-metal server.

16. The system of claim 14, wherein identifying the second bare-metal server comprises:

identifying a first memory capacity of the first bare-metal server; and determining that the second bare-metal server has a second memory capacity that is within a threshold amount of the first memory capacity of the first bare-metal server.

17. The system of claim 14, wherein the instruction is a first instruction, and wherein causing the first bare-metal server to transfer the data associated with the tenant to the second bare-metal server comprises transmitting, to the first bare-metal server, a second instruction to establish a peer-to-peer connection with the second bare-metal server, the second instruction including an identifier of the second bare-metal server.

18. The system of claim 14, wherein the instruction is a first instruction, and wherein causing the first bare-metal server to transfer the data associated with the tenant to the second bare-metal server comprises:

transmitting, to the first bare-metal server, a second instruction to initiate transfer of the data associated with the tenant;

receiving, from the first bare-metal server, state information associated with the tenant, the state information comprising at least one of a clock state, a Basic Input Output System (BIOS) system state, or a Complementary Metal Oxide Semiconductor (CMOS) block setting of the first bare-metal server hosting the tenant; and transmitting, to the second bare-metal server, the state information associated with the tenant.

19. The system of claim 18, wherein causing the first bare-metal server to transfer the data associated with the tenant further comprises:

receiving, from the first bare-metal server, the data associated with the tenant, the data associated with the tenant being stored in a local memory of the first bare-metal server; and transmitting, to the second bare-metal server, the data.

20. The system of claim 14, wherein the operations further comprise:

determining a predicted reboot latency of the first bare-metal server;

determining a predicted data transfer rate from the first bare-metal server to the second bare-metal server;

multiplying the predicted reboot latency by the predicted data transfer rate to determine a threshold amount of data; and determining that the data associated with the tenant is equal to or less than the threshold amount of data.

\* \* \* \* \*